US009182962B2

(12) United States Patent
Kneisel et al.

(10) Patent No.: US 9,182,962 B2
(45) Date of Patent: Nov. 10, 2015

(54) METHOD FOR TRANSLATING A COBOL SOURCE PROGRAM INTO READABLE AND MAINTAINABLE PROGRAM CODE IN AN OBJECT ORIENTED SECOND PROGRAMMING LANGUAGE

(76) Inventors: Todd Bradley Kneisel, Phoenix, AZ (US); Cynthia S. Guenthner, Glendale, AZ (US); Albert Henry John Wigchert, Phoenix, AZ (US); Nicholas John Colasacco, New River, AZ (US); Russell W. Guenthner, Glendale, AZ (US); John Edward Heath, Glendale, AZ (US); Clinton B. Eckard, McMinnville, TN (US)

( * ) Notice: Subject to any disclaimer, the term of this patent is extended or adjusted under 35 U.S.C. 154(b) by 144 days.

(21) Appl. No.: 13/314,041

(22) Filed: Dec. 7, 2011

(65) Prior Publication Data
US 2012/0151437 A1 Jun. 14, 2012

Related U.S. Application Data

(60) Provisional application No. 61/459,227, filed on Dec. 9, 2010.

(51) Int. Cl.
*G06F 9/45* (2006.01)
*G06F 9/44* (2006.01)
(52) U.S. Cl.
CPC ... *G06F 8/51* (2013.01); *G06F 8/31* (2013.01)
(58) Field of Classification Search
None
See application file for complete search history.

(56) References Cited

U.S. PATENT DOCUMENTS

| | | | | | |
|---|---|---|---|---|---|
| 5,838,979 | A | * | 11/1998 | Hart et al. | 717/146 |
| 6,453,464 | B1 | * | 9/2002 | Sullivan | 717/137 |
| 6,904,598 | B2 | * | 6/2005 | Abileah et al. | 719/319 |
| 7,386,840 | B1 | * | 6/2008 | Cockerham et al. | 717/137 |
| 8,145,597 | B1 | * | 3/2012 | Jesurum | 707/609 |
| 2001/0025372 | A1 | * | 9/2001 | Vermeire et al. | 717/7 |
| 2002/0046294 | A1 | * | 4/2002 | Brodsky et al. | 709/246 |
| 2002/0056012 | A1 | * | 5/2002 | Abileah et al. | 709/310 |
| 2004/0019600 | A1 | * | 1/2004 | Charlet et al. | 707/102 |
| 2004/0088689 | A1 | * | 5/2004 | Hammes | 717/154 |
| 2004/0111464 | A1 | * | 6/2004 | Ho et al. | 709/203 |
| 2006/0031820 | A1 | * | 2/2006 | Li | 717/137 |
| 2007/0203936 | A1 | * | 8/2007 | Honishi et al. | 707/102 |
| 2007/0294677 | A1 | * | 12/2007 | Belyy et al. | 717/143 |
| 2011/0093837 | A1 | * | 4/2011 | Guenthner et al. | 717/149 |
| 2014/0189663 | A1 | * | 7/2014 | Guenthner et al. | 717/146 |

* cited by examiner

*Primary Examiner* — Isaac T Tecklu

(57) ABSTRACT

A method is disclosed for translating by a computer system of a COBOL computer program into a translated computer program in a readable and maintainable syntax in an object oriented programming language. The translated program including variable names equivalent to the original COBOL variable names and with attributes described in COBOL syntax. The translating method further providing for memory allocation in the translated computer program for storage of "COBOL" variables compatible with that of the original COBOL program; a description of program flow that is readable, and utilizing arithmetic operators to describe operations between COBOL variables. Also disclosed is a special object oriented run-time library for creating and performing operations between COBOL numeric objects, including maintaining storage of variable content in the original COBOL format, and for enabling readability of the translated source code by allowing arguments for variable type descriptions to be expressed in COBOL syntax.

4 Claims, 32 Drawing Sheets

Exemplary File Description Statement Format in COBOL Source Code  500

```
SELECT [ OPTIONAL ] F1    ASSIGN TO {external-device-name-1} ...
[ RESERVE integer-1 AREA | AREAS ]
[ ORGANIZATION IS [ UFF | ANSI | GFRC | IBM-OS ] SEQUENTIAL
  | WITH SSF | VLR | FLR | SPANNED | WITH BSN ] ]
[ PADDING CHARACTER IS data-name-1 | literal-1 ]
[ RECORD DELIMITER IS STANDARD-1 | UFF ]
[ ACCESS MODE IS SEQUENTIAL ]
[ REPORT CODE IS data-name-3 ]
[ FILE STATUS IS data-name-2 ].

FD file-name-1
  BLOCK CONTAINS [integer-1 TO ] integer-2 RECORDS | CHARACTERS.
  RECORD CONTAINS integer-3 CHARACTERS
    | CONTAINS integer-6 TO integer-7 CHARACTERS
    | IS VARYING IN SIZE [FROM integer-4]  [TO integer-5] CHARACTERS
      [DEPENDING ON data-name-1]
  LABEL RECORDS ARE STANDARD | OMITTED
  VALUE OF FILE-ID | RETENTION | CATALOG-NAME IS data-name-1 | literal-1
  LINAGE IS data-name-4 | integer-8 LINES
  WITH FOOTING AT data-name-5 | integer-9
  LINES AT TOP data-name-6 | integer-10
  LINES AT BOTTOM data-name-7 | integer-11
  CODE-SET IS alphabet-name-1.
```

↑ 525

Exemplary C++ COBOL File Description Constructor Format Translated from COBOL Source Code File Description Statements  550

```
CblFileSelect F1 (
  "OPTIONAL",
  "ASSIGN TO external-device-name-1",  // required field
  "RESERVE integer-1 AREAS",
  "ORGANIZATION IS SEQUENTIAL",  // assumed if not specified
  "UFF | ANSI | GFRC | IBM-OS",
  "SSF | VLR | FLR | SPANNED | BSN",
  "PADDING CHARACTER IS ", data-name-1 | "x",
  "RECORD DELIMITER IS STANDARD-1 | UFF",
  "REPORT CODE IS ", data-name-3,
  "FILE STATUS IS ", data-name-2, "BLOCK CONTAINS [integer-1 TO] integer-2 RECORDS | CHARACTERS", "RECORD CONTAINS integer-6 [TO integer-7] CHARACTERS",
  "RECORD IS VARYING IN SIZE [FROM integer-4] [TO integer-5] CHARACTERS"
  "DEPENDING ON ", data-name-1, "LABEL RECORDS ARE STANDARD | OMITTED"
  "VALUE OF FILE-ID IS ",   data-name-1 | "literal-1",
  "VALUE OF RETENTION IS ", data-name-1 | "literal-1",
  "VALUE OF CATALOG-NAME IS ", data-name-1 | "literal-1",
  "LINAGE IS ",    data-name-4 | "integer-8",
  "WITH FOOTING AT ",    data-name-5 | "integer-9",
  "LINES AT TOP",    data-name-6 | "integer-10",
  "LINES AT BOTTOM",    data-name-7 | "integer-11",
  "CODE-SET IS alphabet-name-1"
);
```

FIG. 5

EXAMP1.cbl -- First Exemplary COBOL source code:

EXAMP1.cbl -- Original COBOL Source File

```
7001  IDENTIFICATION DIVISION.
7002  PROGRAM-ID. EXAMP1.
7003  ENVIRONMENT DIVISION.
7004  CONFIGURATION SECTION.
7005  DATA DIVISION.
7006  WORKING-STORAGE SECTION.
7007  01  A PIC 9  VALUE 3.
7008  01  B PIC 9  VALUE 7.
7009  01  C PIC 99 VALUE 24.
7010  01  D PIC 99 VALUE 15.
7011  01  W PIC 99 VALUE ZEROES.          ⇐⇐⇐
7012  01  X PIC 9  VALUE ZEROES.          ⇐⇐
7013  01  Y PIC 99 VALUE ZEROES.
7014  01  Z PIC 9  VALUE ZEROES.
7015  01  TOT PIC 9 VALUE ZEROES.         ⇐
7016  PROCEDURE DIVISION.
7017  START-UP.
7018  COMPUTE W = A + B.                  ⇐
7019  COMPUTE X = (W * A) / D.            ⇐⇐
7020  COMPUTE Y = C - W.                  ⇐⇐
7021  COMPUTE Z = (C - Y) / X.
7022  COMPUTE TOT = ( (D - B) + (Y - X) ) / Z.  ⇐⇐⇐⇐
7023  IF TOT NOT = 4 DISPLAY "VALUE OF TOT IS WRONG".
7024  CLOSE-UP.
7025  DISPLAY "END OF TEST".
7026  STOP RUN.
```

COMPLETE PROGRAM LISTING (for reference)
of Exemplary C code as output utilizing PRIOR ART COBOL-IT COBOL to C translator
with EXAMP1.cbl program (FIG. 7) as an input COBOL source file

```
8001    /* Generated by          cobc 2.4.1-enterprise-64.0 */
8002    /* COBOL-IT build date   Jan 29 2010 16:36:22 */
8003    /* Compile command       cobc -C EXAMPLE.cbl */
8004
8005    #define __USE_STRING_INLINES 1
8006    #include <stdio.h>
8007    #include <stdlib.h>
8008    #include <string.h>
8009    #include <math.h>
8010    #include <libcob.h>
8011
8012    #define COB_PACKAGE_VERSION    "2.4.1-enterprise-64"
8013    #define COB_PATCH_LEVEL        0
8014
8015    /* Global variables */
8016
8017    /* Source variables */
8018    #include "./EXAMPLE.c.h"
8019
8020    #include "./EXAMPLE.c.d.h"
8021
8022    static void
8023    cob_decimal_set_int (cob_decimal *d, const int n)
8024    {
8025         mpz_set_si (d->value, n);
8026         d->scale = 0;
8027    }
8028
```

FIG. 8A
--Prior Art--

```
8029   #include "./EXAMPLE.c.f.h"
8030   /* Function prototypes */
8031
8032   int EXAMPLE (void);
8033   static int EXAMPLE_ (const int);
8034
8035   /* Functions */
8036
8037   int
8038   EXAMPLE ()
8039   {
8040       return EXAMPLE_ (0);
8041   }
8042
8043   static void
8044   EXAMPLE_module_init (mds_t *loc_cob_mds,   cob_module *module)
8045   {
8046       memset (module, 0, sizeof(cob_module));
8047       module->cob_procedure_parameters = (loc_cob_mds->
8048   sta_EXAMPLE.cob_user_parameters);
8049       module->display_sign              = 0;
8050       module->decimal_point             = '.';
8051       module->currency_symbol           = '$';
8052       module->numeric_separator         = ',';
8053       module->flag_filename_mapping     = 1;
8054       module->flag_binary_truncate      = 1;
8055       module->flag_pretty_display       = 1;
8056       module->module_name               = "EXAMPLE";
8057       module->source_file               = COB_SOURCE_FILE;
8058       module->cur_source_file           = COB_SOURCE_FILE;
8059       module->default_cp                = "ASCII";
8060       module->data_storage              = loc_cob_mds;
8061       module->runtime_flags             = 0;
8062   }
8063
```

```
8064  static int
8065  EXAMPLE_ (const int entry)
8066  {
8067      /* Local variables */
8068      #include "./EXAMPLE.c.l.h"
8069      #include "./EXAMPLE.c.r.h"
8070
8071      /* runtime & module data */
8072      COB_RTD = cob_get_rtd();
8073      cob_module loc_module;
8074      cob_module *module= &loc_module;
8075
8076      /* Start of function code */
8077      EXAMPLE_module_init (COB_MDS_REF, module);
8078
8079      /* CANCEL callback handling */
8080      if (unlikely(entry < 0)) {
8081          if (! (COB_MDS f_EXAMPLE.initialized)) {
8082              return 0;
8083          }
8084          cob_decimal_clear (&(COB_MDS f_EXAMPLE.d0));
8085          si0 = 0;
8086          ui0 = 0;
8087          sf0 = 0;
8088          sd0 = 0;
8089          cob_decimal_clear (&(COB_MDS f_EXAMPLE.d1));
8090          si1 = 0;
8091          ui1 = 0;
8092          sf1 = 0;
8093          sd1 = 0;
8094          cob_decimal_clear (&(COB_MDS f_EXAMPLE.d2));
8095          si2 = 0;
8096          ui2 = 0;
8097          sf2 = 0;
```

```
8098        sd2      = 0;
8099        cob_decimal_clear (&(COB_MDS f_EXAMPLE.d3));
8100        si3      = 0;
8101        ui3      = 0;
8102        sf3      = 0;
8103        sd3      = 0;
8104        COB_MDS f_EXAMPLE.initialized = 0;
8105        return 0;
8106    }
8107
8108    /* Initialize frame stack */
8109    frame_ptr = &frame_stack[0];
8110    frame_ptr->perform_through = 0;
8111
8112    cob_module_enter(rtd, module);
8113    if (unlikely(COB_MDS f_EXAMPLE.initialized == 0))
8114    {
8115        if (!rtd->cob_initialized) {
8116            cob_fatal_error (rtd, COB_FERROR_INITIALIZED);
8117        }
8118        cob_check_version (rtd, COB_SOURCE_FILE, COB_PACKAGE_VERSION, COB_PATCH_LEVEL);
8119        if (COB_MDS initialized != 0711) {
8120            init_fields(rtd, COB_MDS_REF);
8121            COB_MDS initialized = 0711;
8122        }
8123        cob_set_cancel (rtd, (const char *)"EXAMPLE", (void *)EXAMPLE, (void
*)EXAMPLE_);
8125        /* Initialize decimal numbers */
8126        cob_decimal_init (&(COB_MDS f_EXAMPLE.d0));
8127        si0 =0;
8128        ui0 =0;
8129        sf0 =0;
8130        sd0 =0;
8131        cob_decimal_init (&(COB_MDS f_EXAMPLE.d1));
```

FIG. 8D

--Prior Art--

```
8132    si1 = 0;
8133    ui1 = 0;
8134    sf1 = 0;
8135    sd1 = 0;
8136    cob_decimal_init (&(COB_MDS f_EXAMPLE.d2));
8137    si2 = 0;
8138    ui2 = 0;
8139    sf2 = 0;
8140    sd2 = 0;
8141    cob_decimal_init (&(COB_MDS f_EXAMPLE.d3));
8142    si3 = 0;
8143    ui3 = 0;
8144    sf3 = 0;
8145    sd3 = 0;
8146
8147    (*(int *) (b_1)) = 0;
8148    (*(int *) (b_2)) = 0;
8149    *(b_6) = 51;
8150    *(b_7) = 55;
8151    memcpy (b_8, "24", 2);
8152    memcpy (b_9, "15", 2);
8153    memset (b_10, 48, 2);
8154    *(unsigned char *)(b_11) = 48;
8155    memset (b_12, 48, 2);
8156    *(unsigned char *)(b_13) = 48;
8157    *(unsigned char *)(b_14) = 48;
8158    COB_MDS f_EXAMPLE.initialized = 1;
8159    }
8160    rtd->cob_save_call_params = rtd->cob_call_params;
8161
8162    /* Entry dispatch */
8163    goto l_3;
8164
8165
```

FIG. 8E
--Prior Art--

```
8166   /* PROCEDURE DIVISION */
8167
8168   /* Entry EXAMPLE */
8169
8170   1_3:;
8171
8172   /* MAIN SECTION */
8173
8174   /* START-UP */
8175
8176   cob_decimal_set_int (&(COB_MDS f_EXAMPLE.d0), cob_get_numdisp (b_6, 1));
8177   cob_decimal_set_int (&(COB_MDS f_EXAMPLE.d1), cob_get_numdisp (b_7, 1));
8178   cob_decimal_add (rtd, &(COB_MDS f_EXAMPLE.d0), &(COB_MDS f_EXAMPLE.d1));
8179   cob_decimal_get_field (rtd, &(COB_MDS f_EXAMPLE.d0), &f_10, 0);
8180   cob_decimal_set_int (&(COB_MDS f_EXAMPLE.d0), cob_get_numdisp (b_10, 2));
8181   cob_decimal_set_int (&(COB_MDS f_EXAMPLE.d2), cob_get_numdisp (b_6, 1));
8182   cob_decimal_mul (&(COB_MDS f_EXAMPLE.d0), &(COB_MDS f_EXAMPLE.d2));
8183   cob_decimal_set_int (&(COB_MDS f_EXAMPLE.d1), cob_get_numdisp (b_9, 2));
8184   cob_decimal_div (rtd, &(COB_MDS f_EXAMPLE.d0), &(COB_MDS f_EXAMPLE.d1));
8185   cob_decimal_get_field (rtd, &(COB_MDS f_EXAMPLE.d0), &f_11, 0);
8186   cob_decimal_set_int (&(COB_MDS f_EXAMPLE.d0), cob_get_numdisp (b_8, 2));
8187   cob_decimal_set_int (&(COB_MDS f_EXAMPLE.d1), cob_get_numdisp (b_10, 2));
8188   cob_decimal_sub (rtd, &(COB_MDS f_EXAMPLE.d0), &(COB_MDS f_EXAMPLE.d1));
8189   cob_decimal_get_field (rtd, &(COB_MDS f_EXAMPLE.d0), &f_12, 0);
8190   cob_decimal_set_int (&(COB_MDS f_EXAMPLE.d0), cob_get_numdisp (b_8, 2));
8191   cob_decimal_set_int (&(COB_MDS f_EXAMPLE.d2), cob_get_numdisp (b_12, 2));
8192   cob_decimal_sub (rtd, &(COB_MDS f_EXAMPLE.d0), &(COB_MDS f_EXAMPLE.d2));
8193   cob_decimal_set_int (&(COB_MDS f_EXAMPLE.d1), cob_get_numdisp (b_11, 1));
8194
```

FIG. 8F  --Prior Art--

```
8195    cob_decimal_div (rtd, &(COB_MDS f_EXAMPLE.d0), &(COB_MDS f_EXAMPLE.d1));
8196    cob_decimal_get_field (rtd, &(COB_MDS f_EXAMPLE.d0), &f_13, 0);
8197    cob_decimal_set_int (&(COB_MDS f_EXAMPLE.d0), cob_get_numdisp (b_9, 2));
8198    cob_decimal_set_int (&(COB_MDS f_EXAMPLE.d3), cob_get_numdisp (b_7, 1));
8199    cob_decimal_sub (rtd, &(COB_MDS f_EXAMPLE.d0), &(COB_MDS f_EXAMPLE.d3));
8200    cob_decimal_set_int (&(COB_MDS f_EXAMPLE.d2), cob_get_numdisp (b_12, 2));
8201    cob_decimal_set_int (&(COB_MDS f_EXAMPLE.d3), cob_get_numdisp (b_11, 1));
8202    cob_decimal_sub (rtd, &(COB_MDS f_EXAMPLE.d2), &(COB_MDS f_EXAMPLE.d3));
8203    cob_decimal_add (rtd, &(COB_MDS f_EXAMPLE.d0), &(COB_MDS f_EXAMPLE.d2));
8204    cob_decimal_set_int (&(COB_MDS f_EXAMPLE.d1), cob_get_numdisp (b_13, 1));
8205    cob_decimal_div (rtd, &(COB_MDS f_EXAMPLE.d0), &(COB_MDS f_EXAMPLE.d1));
8206    cob_decimal_get_field (rtd, &(COB_MDS f_EXAMPLE.d0), &f_14, 0);
8207    if (((int)cob_cmp_numdisp (rtd, b_14, 1, 4) != 0))
8208    {
8209      cob_display (rtd, 0, 1, 1, &c_1);
8210    }
8211
8212    /* CLOSE-UP */
8213
8214    cob_display (rtd, 0, 1, 1, &c_2);
8215    cob_stop_run (rtd, (*(int *) (b_1)));
8216
8217    /* Program exit */
8218
8219    /* Pop module stack */
8220
8221    cob_module_leave(rtd, module);
8222    /* Program return */
8223    return (*(int *) (b_1));
8224
8225  }
8226
8227  /* End functions */
9001
10001
```

FIG. 8G

--Prior Art--

Exemplary READABLE code as output in practice of a first illustrated embodiment of the present invention
(with EXAMP1.cbl program (FIG. 7) as input COBOL source file)

```
9001  #include <iostream>                The "normal" "C" declaration of the data for variable "A" in memory -- the variable is named "c_A"
9002  using namespace std;
9003  #include <CblString.h>
9004  int main () {                       Declaration (creation) of a COBOL String "object" ... using a C++ CONSTRUCTOR --
9005                                      the object is named "A" (the original variable name) -- the created object points to and
9006                                      describes the memory storage format and/or attributes of the actual memory data
9007      static char c_A[1];       CblString  A(  c_A,    "PIC 9 VALUE 3");            //-01  A PIC 9     VALUE 3.
9008      static char c_B[1];       CblString  B(  c_B,    "PIC 9 VALUE 7");            //-01  B PIC 9     VALUE 7.
9009      static char c_C[2];       CblString  C(  c_C,    "PIC 99 VALUE 24");          //-01  C PIC 99    VALUE 24.
9010      static char c_D[2];       CblString  D(  c_D,    "PIC 99 VALUE 15");          //-01  D PIC 99    VALUE 15.
9011      static char c_W[2];       CblString  W(  c_W,    "PIC 99 VALUE ZEROES ");     //-01  W PIC 99    VALUE ZEROES.
9012      static char c_X[1];       CblString  X(  c_X,    "PIC 9 VALUE ZEROES ");      //-01  X PIC 9     VALUE ZEROES.
9013      static char c_Y[2];       CblString  Y(  c_Y,    "PIC 99 VALUE ZEROES ");     //-01  Y PIC 99 VALUE ZEROES.
9014      static char c_Z[1];       CblString  Z(  c_Z,    "PIC 9 VALUE ZEROES ");      //-01  Z PIC 9 VALUE ZEROES.
9015      static char c_TOT[1];     CblString  TOT( c_TOT, "PIC 9 VALUE ZEROES ");      //-01  TOT PIC 9 VALUE
9016  ZEROES.
9017
9018  // GENERATED READABLE C++ CODE                                                    //- ORIGINAL COBOL SOURCE CODE.
9019      START_UP:                                                                     //- 100039 START-UP.
9020      W = A + B;                                                                    //- 100054 COMPUTE W = A + B.
9021      X = (W * A) / D;                                                              //- 100055 COMPUTE X = (W * A) / D.
9022      Y = C - W;                                                                    //- 100058 COMPUTE Y = C - W.
9023      Z = (C - Y) / X;                                                              //- 100061 COMPUTE Z = (C - Y) / X.
9024      TOT = ( (D - B) + (Y - X) ) / Z;                                              //- 100062 COMPUTE TOT = ((D - B) + (Y - X)) / Z.
9025                                                                                    //- 100063 IF TOT NOT = 4 DISPLAY "VALUE OF TOT IS WRONG".
9026      if( TOT != 4 ) { cout << "VALUE OF TOT IS WRONG" << endl;
9027      cout << "END OF TEST" << endl;                                                //- 100065 DISPLAY "END OF TEST".
9028      return(0);                                                                    //- 100067 STOP RUN.
9029  }
```

FIG. 9

Exemplary READABLE code as output in practice of a second illustrated embodiment of the present invention
(with EXAMP1.cbl program from Figure 7 as input COBOL source file)
// In this example, the first and second memory storage are both allocated and managed
// by the CblVarDisplay Constructors and Desctructors:

```
10001    #include "CblVarDisplay.h"
10002
10003    int main () {
10004
10005
10006        static CblVarDisplay A ( "PIC 9 VALUE 3",     00300010000);     Declaration of a COBOL String "object" ... using a C++ CONSTRUCTOR –
10007        static CblVarDisplay B ( "PIC 9 VALUE 7",     00300010000);     the object is named "A" (the original variable name) -- the object points to and describes the
10008        static CblVarDisplay C ( "PIC 99 VALUE 24",   00300020000);     memory storage format and /or attributes of the actual memory data
10009        static CblVarDisplay D ( "PIC 99 VALUE 15",   00300020000);
10010        static CblVarDisplay W ( "PIC 99 VALUE ZEROES", 00300020000);
10011        static CblVarDisplay X ( "PIC S9V99 VALUE ZEROES", 00376030000);
10012        static CblVarDisplay Y ( "PIC S99V9 VALUE ZEROES", 00376030000);
10013        static CblVarDisplay Z ( "PIC 9 VALUE ZEROES", 00300010000);
10014        static CblVarDisplay TOT ( "PIC 9 VALUE ZEROES", 00300010000);
10015
10016    // GENERATED READABLE C++ CODE              //- ORIGINAL COBOL SOURCE CODE.
10017        START_UP:                               //-100039  START-UP.
10018        W = A + B;                              //-100054  COMPUTE W = A + B.
10019        X = (W * A) / D;                        //-100055  COMPUTE X = (W * A) / D.
10020        Y = C - W;                              //-100058  COMPUTE Y = C - W.
10021        Z = (C - Y) / X;                        //-100061  COMPUTE Z = (C - Y) / X.
10022        TOT = ((D - B) + (Y - X)) / Z;          //-100062  COMPUTE TOT = ((D - B) + (Y - X)) / Z.
10023                                                //-100063  IF TOT NOT = 4   DISPLAY "VALUE OF TOT IS WRONG".
10024        if( TOT != 4 ){ cout << "VALUE OF TOT IS WRONG" << endl; }
10025        cout << "END OF TEST" << endl;          //-100065  DISPLAY "END OF TEST".
10026        return(0);                              //-100067  STOP RUN.
10027    }
```

FIG. 10

FIGURE 11 – CLASS, CONSTRUCTOR, DESTRUCTOR and Overloaded Operator
as a simplified example in the manner of an illustrated embodiment of the present invention

```
11001   // CBLSTRING - EXAMPLE C++ "CLASS"
11002   #include <iostream>
11003   #include <iomanip>
11004   #include <string.h>
11005   using namespace std;
11006   extern "C" {
11007   #include "v9pr_types.h"
11008   #include "pk_numeric.h"
11009   #include "validate_pic.h"
11010   }
11011   #include "CblVarString.h"
11012   // Constructor
11013   // "data" is the string from the COBOL translator
11014   // that describes the COBOL declared variable
11015
11016   CblVarString::CblVarString( char *data )
11017   : CblVar()
11018   {
11019       struct pic_in_t  validate_args;
11020       char *memory;
11021
11022       parse( data, &parsed_data );   // analyze the PIC string
11023       validate_args.pic_l = strlen(parsed_data.pic_str);
11024       validate_args.mop_l = 64;
11025       if ( parsed_data.blank == BLANK )
11026           validate_args.blank_when_zero = 1;
11027       else
11028           validate_args.blank_when_zero = 0;
11029
11030
```

FIG. 11A

```
11031   if( validate_pic( parsed_data.pic_str, &validate_args, &pic_out ) != 0 )
11032   {
11033       cerr << "Error parsing pic string \"" << parsed_data.pic_str << "\"" << endl;
11034       cerr << "Error status = " << pic_out.error << endl;
11035       cerr << "Error position = " << pic_out.errcol << endl;
11036   }
11037
11038   m_descriptor.initialize(&parsed_data,&pic_out);
11039
11040   set_length( m_descriptor.length() );
11041   memory = get_mem( get_length() );
11042
11043   if ( memory != 0 )
11044   { int len;
11045     int pos;
11046     switch (parsed_data.value)
11047     { case NO_VALUE:
11048         memset( memory,'\000',get_length() );
11049         break;
11050       case ADDRESS:
11051         break;
11052       case ONE_LITERAL:
11053         switch (parsed_data.lit1)
11054         {
11055           case NO_LIT:
11056             break;
11057           case LIT_NONNUMERIC:
11058             break;
11059           case LIT_NUMERIC:
11060             len = strlen( parsed_data.lit1_str );
11061             pos = get_length() - len;
11062             if( len < get_length() )
11063             {
11064               for( int i = 0; i < pos; i++ )
11065                 memory[i] = '0';
11066             }
11067
```

FIG. 11B

```
11068                    memcpy( memory + pos, parsed_data.lit1_str, len );
11069                    break;
11070                case LIT_NULL:
11071                    break;
11072                case LIT_ZERO:
11073                    memset( memory,'0',get_length() );
11074                    break;
11075                case LIT_SPACE:
11076                    break;
11077                case LIT_HIGH:
11078                    break;
11079                case LIT_LOW:
11080                    break;
11081                case LIT_QUOTE:
11082                    break;
11083                }
11084                break;
11085            case TWO_LITERALS:
11086                break;
11087        }
11088    } }
11089
11090    CblVarString::CblVarString( char *mem, const CblDescriptor &desc )
11091    : CblVar()
11092    {
11093        char *memory;
11094        set_length( desc.length() );
11095        memory = get_temp_mem( get_length() );
11096        memcpy( memory, mem, get_length() );
11097        m_descriptor = desc;
11098        parsed_data.pic_str = NULL;
11099        parsed_data.lit1_str = NULL;
11100        parsed_data.lit2_str = NULL;
11101        memset( &pic_out,0,sizeof(pic_out_t));
11102        pic_out.type = NUMERIC;
11103    }
11104
```

FIG. 11C

```
11105       // Copy Constructor
11106       CblVarString::CblVarString( const CblVarString &op )
11107         : CblVar()
11108       {
11109       #ifdef DEBUG_CBLVARSTRING_CONSTRUCTORS
11110           cout << "CblVarString(&CblVarString) copy constructor" << endl;
11111       #endif
11112           set_length( op.get_length() );
11113           set_offset( op.get_offset() );
11114           m_descriptor = op.desc();
11115           parsed_data.pic_str = NULL;
11116           parsed_data.lit1_str = NULL;
11117           parsed_data.lit2_str = NULL;
11118       }
11119
11120       // Destructor
11121       CblVarString::~CblVarString()
11122       {
11123       #ifdef DEBUG_CBLVARSTRING_CONSTRUCTORS
11124           //cout << "~CblVarString() destructor" << endl;
11125       #endif
11126           delete [] parsed_data.pic_str;
11127           delete [] parsed_data.lit1_str;
11128           delete [] parsed_data.lit2_str;
11129       }
11130
11131       // Overloaded << operator, for displaying CblVarString objects.
11132       ostream &operator<<( ostream &output, const CblVarString &str )
11133       {
11134           output << "<CblVarString=\"";
11135           for( int i = 0; i < str.get_length(); i++ )
11136               output << str.get_memp()[i];
11137           output << "\">";
11138
11139           return output;
11140       }
```

FIG. 11D

EXAMP2.cbl – Second Exemplary COBOL source code

```
12001      IDENTIFICATION DIVISION.    PROGRAM-ID. NC0435B.
12002      ENVIRONMENT DIVISION. CONFIGURATION SECTION. DATA DIVISION.
12003      WORKING-STORAGE SECTION.
12004      01  A      PIC 9         VALUE 3.
12005      01  B      PIC 9         VALUE 7.
12006      01  C      PIC 99        VALUE 24.
12007      01  D      PIC 99        VALUE 15.
12008      01  D-X    REDEFINES D PIC XX.
12009      01  W      PIC 99        VALUE ZEROES.
12010      01  X      PIC S99V99    VALUE ZEROES.
12011      01  Y      PIC S99V9     VALUE ZEROES.
12012      01  Z      PIC 9         VALUE ZEROES.
12013      01  TOTAL  PIC 9         VALUE ZEROES.
12014      01  X-E    PIC $9.99CR.
12015      01  Y-E    PIC +99.99.
12016      01  RECORD-1.
12017        02  GROUP-1.
12018          03  A-RAY PIC 99 OCCURS 8 TIMES.
12019      PROCEDURE DIVISION.
12020      START-UP.
12021          DISPLAY "D-X(2:1) = ", D-X(2:1).
12022          COMPUTE A-RAY (A + 1) = A ** 3.
12023          COMPUTE W = A + B.
12024          COMPUTE X = (W * A) / D.
12025          COMPUTE Y = C - W.
12026          COMPUTE Z = (C - Y) / X.
12027          COMPUTE TOTAL = ( (D - B) + (Y - X) ) / Z.
12028          MOVE X TO X-E. DISPLAY "X = ", X, " X-E = ", X-E.
12029          MOVE Y TO Y-E. DISPLAY "Y = ", Y, " Y-E = ", Y-E, " TOTAL = ", TOTAL.
12030          IF TOTAL NOT = 4 DISPLAY "VALUE OF TOTAL IS WRONG".
12031      CLOSE-UP.
12032          DISPLAY "END OF TEST".
12033          STOP RUN.
12034
```

FIG. 12

FIGURE 13 -- Output from running EXAMP2 COBOL program executable

Results File:

```
13001    D-X(2:1) = 5
13002    X = +2.00 X-E = $2.00
13003    Y = +14.0 Y-E = +14.00 TOTAL = 4
13004    END OF TEST
```

FIG. 13

Figure 14 -- Transcoded JAVA Output File using NACA tool for COBOL (Examp2) to JAVA translation:

```
14001    import nacaLib.program.*;
14002    import nacaLib.varEx.*;
14003    import nacaLib.batchPrgEnv.BatchProgram;
14004    public class NC0435B extends BatchProgram
14005    {
14006       DataSection workingstoragesection = declare.workingStorageSection();   // (1)  IDENTIFICATION DIVISION.
14007    SECTION.                                                                   // (6)  WORKING-STORAGE
14008       Var a = declare.level(1).pic9(1).value(3).var();                        // (7)  01  A PIC 9       VALUE 3.
14009       Var b = declare.level(1).pic9(1).value(7).var();                        // (8)  01  B PIC 9       VALUE 7.
14010       Var c = declare.level(1).pic9(2).value(24).var();                       // (9)  01  C PIC 99      VALUE 24.
14011       Var d = declare.level(1).pic9(2).value(15).var();                       // (10) 01  D PIC 99      VALUE 15.
14012       Var d_X = declare.level(1).redefines(d).picX(2).var();                  // (11) 01  D-X REDEFINES D PIC XX.
14013       Var w = declare.level(1).pic9(2).valueZero().var();                     // (12) 01  W PIC 99 VALUE ZEROES.
14014       Var x = declare.level(1).picS9(1,2).valueZero().var();                  // (13) 01  X PIC S9V99 VALUE ZEROES.
14015       Var y = declare.level(1).picS9(2,1).valueZero().var();                  // (14) 01  Y PIC S99V9 VALUE ZEROES.
14016       Var z = declare.level(1).pic9(1).valueZero().var();                     // (15) 01  Z PIC 9       VALUE ZEROES.
14017       Var total = declare.level(1).pic9(1).valueZero().var();                 // (16) 01  TOTAL PIC 9  VALUE ZEROES.
14018       Var x_E = declare.level(1).pic("+9.99").var();                          // (17) 01  X-E PIC +9.99.
14019       Var y_E = declare.level(1).pic("+99.99").var();                         // (18) 01  Y-E PIC +99.99.
14020       Var record_1 = declare.level(1).var();                                  // (19) 01  RECORD-1.
14021       Var group_1 = declare.level(2).var();                                   // (20)    02 GROUP-1.
14022       Var a_Ray = declare.level(3).occurs(8).pic9(2).var();                   // (21)       03 A-RAY PIC 99 OCCURS 8 TIMES.
14023
14024                                                                               // (22) PROCEDURE DIVISION.
14025       Paragraph start_Up = new Paragraph(this);                               // (23) START-UP.
14026       public void start_Up() {
14027
14028          display("D-X(2:1) = " + val(d_X.subString(2, 1)));                   // (24) DISPLAY "D-X(2:1) = ", D-X(2:1).
14029
14030          compute(power(a, 3), a_Ray.getAt(add(a, 1)));                        // (25) COMPUTE A-RAY (A + 1) = A ** 3.
14031          compute(add(a, b), w);                                               // (26) COMPUTE W = A + B.
14032          compute(divide(multiply(w, a), d), x);                               // (27) COMPUTE X = (W * A) / D.
14033
```

FIG. 14A

```
14034      compute(subtract(c, w), y);              // (28) COMPUTE Y = C - W.
14035      compute(divide(subtract(c, y), x), z); // (29) COMPUTE Z = (C - Y) / X.
14036      compute(                                 // (30) COMPUTE TOTAL = ( (D - B) + (Y - X) ) / Z.
14037              divide(add(subtract(d, b),subtract(y, x)), z), total);
14038      move(x, x_E);                            // (31) MOVE X TO X-E. DISPLAY "X = ", X, " X-E = ", X-E.
14039      display("X = " + val(x) + " X-E = " + val(x_E));
14040
14041      move(y, y_E);                            // (32) MOVE Y TO Y-E.
14042                                               // DISPLAY "Y = ", Y, " Y-E = ", Y-E, " TOTAL = "
14043      display("Y = " + val(y) + " Y-E = " + val(y_E) + " TOTAL = ");
14044
14045      if (isDifferent(total, 4)) {             // (33) IF TOTAL NOT = 4 DISPLAY "VALUE OF TOTAL IS WRONG".
14046         display("VALUE OF TOTAL IS WRONG");
14047      }
14048    }
14049    Paragraph close_Up = new Paragraph(this);  // (34)  CLOSE-UP.
14050    public void close_Up() {
14051
14052      display("END OF TEST");                   // (35) DISPLAY "END OF TEST".
14053      stopRun();                                // (36) STOP RUN.
14054    }
14055  }
```

FIG. 14B

Translated COBOL expressed in C++ for EXAMP2.cbl program

Exemplary COMPACT and READABLE code as output in practice of a second illustrated embodiment of the present invention

```
15001   int main() {
15002       CblVarDISPLAY  A         ( "01 PIC 9        VALUE 3."  );
15003       CblVarCOMP_6   B
15004       CblVarDISPLAY  C         ( "01 VALUE 7."  );
15005       CblVarDISPLAY  D         ( "01 PIC 99       VALUE 24." );
15006       CblVarDISPLAY  W         ( "01 PIC 99       VALUE 15." );
15007       CblVarDISPLAY  X         ( "01 PIC 99       VALUE ZEROES." );
15008       CblVarDISPLAY  Y         ( "01 PIC S9V99    VALUE ZEROES." );
15009       CblVarDISPLAY  Z         ( "01 PIC S99V9    VALUE ZEROES." );
15010       CblVarDISPLAY  TOTAL     ( "01 PIC 9        VALUE ZEROES." );
15011       CblVarDISPLAY  X_E       ( "01 PIC $9.99CR." );
15012       CblVarDISPLAY  Y_E       ( "01 PIC +99.99." );
15013
15014       // PROCEDURE DIVISION.
15015       START-UP:
15016           W = A + B;
15017           X = (W * A) / D;
15018           Y = C - W;
15019           X_E = X;           cout << "X = " << X_E << endl;
15020           Y_E = Y;           cout << "Y = " << Y_E << endl;
15021           Z = (C - Y) / X;
15022           TOTAL = ( (D - B) + (Y - X) ) / Z;
15023           IF ( TOTAL != 4 ) { cout << "VALUE OF TOTAL IS WRONG" << endl; }
15024       CLOSE-UP:
15025           cout << "END OF TEST" << endl;
15026           STOPRUN();
15027       }
```

FIG. 15

Transcoded JAVA Output File using "RES" Prior Art tool for COBOL to JAVA translation:
(Main part of program is listed immediately below; Entire program follows immediately.
"RES" tool described on World Wide Web at: "http://openCOBOL2JAVA.sourceforge.net/" )

// Main Part of JAVA program copied from entire listing immediately below

```
16163      public COBOLMethod run() {
16164          //@COBOLSourceFile("EXAMP1L.cbl",17,12)
16165          //PERFORM 1000 TIMES
16166          //        ...END-PERFORM
16167          for(int i0=1000;i0>0;--i0) {
16168              //@COBOLSourceFile("EXAMP1L.cbl",18,14)
16169              //COMPUTE W = A + B
16170              setW(getA() + getB());
16171              //@COBOLSourceFile("EXAMP1L.cbl",19,14)
16172              //COMPUTE X = (W * A) / D
16173              setX((int) ((double) ((getW() * getA())) / getD()));
16174              //@COBOLSourceFile("EXAMP1L.cbl",20,14)
16175              //COMPUTE Y = C - W
16176              setY(getC() - getW());
16177              //@COBOLSourceFile("EXAMP1L.cbl",21,14)
16178              //COMPUTE Z = (C - Y) / X
16179              setZ((int) ((double) ((getC() - getY())) / getX()));
16180              //@COBOLSourceFile("EXAMP1L.cbl",22,14)
16181              //COMPUTE TOT = ( (D - B) + (Y - X) ) / Z
16182              setTot((int) ((double) (((getD()-getB()) + (getY() - getX())) / getZ()));
16183              //@COBOLSourceFile("EXAMP1L.cbl",23,14)
16184              //IF TOT NOT = 4
16185              //END-IF
16186              if(getTot() != 4) {
16187                  //@COBOLSourceFile("EXAMP1L.cbl",24,16)
16188                  //DISPLAY "VALUE OF TOT IS WRONG"
16189                  Console.println("VALUE OF TOT IS WRONG");
16190              }
16191          }
16192          return doCOBOLExit();
16193      }};
```

FIG. 16A          --PRIOR ART--

```
// Entire JAVA Program from "RES" COBOL to JAVA Prior Art Translation tool
16001      package COBOLProgramClasses;
16002      /*****************************************************************
16003      ** RES generated this class file from COBOL program EXAMP1L in source file EXAMP1L.CBL
16004      ** Generated at time 11:50:07.82 on Monday, 10/25/10
16005      *****************************************************************/
16006      import com.res.JAVA.lib.*;
16007      import com.res.JAVA.lib.exceptions.*;
16008      import JAVA.math.BigDecimal;
16009
16010      @SuppressWarnings("unused")
16011      public class Examp1l extends Program {
16012
16013              //@COBOLSourceFile("EXAMP1L.cbl",6,8)
16014              //01  A PIC 9 VALUE 3.
16015
16016              public int getA() {
16017                      return super.getDisplayInt(0,1,false,false,false);
16018              }
16019              public String getAAsString() {
16020                      return super.toString(0,1);
16021              }
16022              public void setA(int val) {
16023                      super.setDisplayInt(0,1,val,false,false,false);
16024              }
16025              public void setA(String val) {
16026                      super.valueOf(0,1,val,true);
16027              }
16028              //@COBOLSourceFile("EXAMP1L.cbl",7,8)
16029              //01  B PIC 9 VALUE 7.
16030
16031              public int getB() {
16032                      return super.getDisplayInt(1,1,false,false,false);
16033              }
16034      }
```

FIG. 16B  --PRIOR ART --

```
public String getBAsString() {
    return super.toString(1,1);
}
public void setB(int val) {
    super.setDisplayInt(1,1,val,false,false,false);
}
public void setB(String val) {
    super.valueOf(1,1,val,true);
}
//@COBOLSourceFile("EXAMP1L.cbl",8,8)
//01  C PIC 99 VALUE 24.
public int getC() {
    return super.getDisplayInt(2,2,false,false,false);
}
public String getCAsString() {
    return super.toString(2,2);
}
public void setC(int val) {
    super.setDisplayInt(2,2,val,false,false,false);
}
public void setC(String val) {
    super.valueOf(2,2,val,true);
}
//@COBOLSourceFile("EXAMP1L.cbl",9,8)
//01  D PIC 99 VALUE 15.
public int getD() {
    return super.getDisplayInt(4,2,false,false,false);
}
public String getDAsString() {
    return super.toString(4,2);
}
public void setD(int val) {
    super.setDisplayInt(4,2,val,false,false,false);
}
public void setD(String val) {
    super.valueOf(4,2,val,true);
}
```

FIG. 16C   -- PRIOR ART --

```
16075  //@COBOLSourceFile("EXAMP1L.cbl",10,8)
16076  //01  W PIC 99 VALUE ZEROES.
16077
16078  public int getW() {
16079      return super.getDisplayInt(6,2,false,false,false);
16080  }
16081  public String getWAsString() {
16082      return super.toString(6,2);
16083  }
16084  public void setW(int val) {
16085      super.setDisplayInt(6,2,val,false,false,false);
16086  }
16087  public void setW(String val) {
16088      super.valueOf(6,2,val,true);
16089  }
16090  //@COBOLSourceFile("EXAMP1L.cbl",11,8)
16091  //01  X PIC 9  VALUE ZEROES.
16092
16093  public int getX() {
16094      return super.getDisplayInt(8,1,false,false,false);
16095  }
16096  public String getXAsString() {
16097      return super.toString(8,1);
16098  }
16099  public void setX(int val) {
16100      super.setDisplayInt(8,1,val,false,false,false);
16101  }
16102  public void setX(String val) {
16103      super.valueOf(8,1,val,true);
16104  }
16105  //@COBOLSourceFile("EXAMP1L.cbl",12,8)
16106  //01  Y PIC 99 VALUE ZEROES.
16107
16108  public int getY() {
16109      return super.getDisplayInt(9,2,false,false,false);
16110  }
16111  public String getYAsString() {
16112      return super.toString(9,2);
16113  }
16114
```

FIG. 16D  --PRIOR ART--

```
16115    public   void setY(int val) {
16116               super.setDisplayInt(9,2,val,false,false,false);
16117    }
16118    public   void setY(String val) {
16119               super.valueOf(9,2,val,true);
16120    }
16121  //@COBOLSourceFile("EXAMP11.cbl",13,8)
16122  //01  Z PIC 9 VALUE ZEROES.
16123
16124    public int getZ() {
16125               return super.getDisplayInt(11,1,false,false,false);
16126    }
16127    public String getZAsString() {
16128               return super.toString(11,1);
16129    }
16130    public   void setZ(int val) {
16131               super.setDisplayInt(11,1,val,false,false,false);
16132    }
16133    public   void setZ(String val) {
16134               super.valueOf(11,1,val,true);
16135    }
16136  //@COBOLSourceFile("EXAMP11.cbl",14,8)
16137  //01  TOT PIC 9 VALUE ZEROES.
16138
16139    public int getTot() {
16140               return super.getDisplayInt(12,1,false,false,false);
16141    }
16142    public String getTotAsString() {
16143               return super.toString(12,1);
16144    }
16145    public   void setTot(int val) {
16146               super.setDisplayInt(12,1,val,false,false,false);
16147    }
16148    public   void setTot(String val) {
16149               super.valueOf(12,1,val,true);
16150    }
16151
```

FIG. 16E     --PRIOR ART--

```
public static void main(String[] args) {
    processCmdLineArgs(args);
    Examp1l instance_ = new Examp1l();
    instance_.execute(null);
    System.exit(instance_.__getReturnCode());
}
public void execute(ProgramEnv __env) {
    initialize(this);
    doCOBOLGotoStart();
}
Paragraph startUp=new Paragraph(this);
public COBOLMethod run() {
    //@COBOLSourceFile("EXAMP1L.cbl",17,12)
    //PERFORM 1000 TIMES
    //                  ...END-PERFORM
    for(int i0=1000;i0>0;--i0) {
        //@COBOLSourceFile("EXAMP1L.cbl",18,14)
        //COMPUTE W = A + B
        setW(getA() + getB());
        //@COBOLSourceFile("EXAMP1L.cbl",19,14)
        //COMPUTE X = (W * A) / D
        setX((int) ((double) ((getW() * getA())) / getD()));
        //@COBOLSourceFile("EXAMP1L.cbl",20,14)
        //COMPUTE Y = C - W
        setY(getC() - getW());
        //@COBOLSourceFile("EXAMP1L.cbl",21,14)
        //COMPUTE Z = (C - Y) / X
        setZ((int) ((double) ((getC() - getY())) / getX()));
        //@COBOLSourceFile("EXAMP1L.cbl",22,14)
        //COMPUTE TOT = ( (D - B) + (Y - X) ) / Z
        setTot((int) ((double) (((getD()-getB())+(getY()-getX()))/getZ()));
        //@COBOLSourceFile("EXAMP1L.cbl",23,14)
        //IF TOT NOT = 4
        //END-IF
        if(getTot() != 4) {
            //@COBOLSourceFile("EXAMP1L.cbl",24,16)
            //DISPLAY "VALUE OF TOT IS WRONG"
            Console.println("VALUE OF TOT IS WRONG");
        }
    }
}
```

FIG. 16F  --PRIOR ART--

```
16192            return doCOBOLExit();
16193        }};
16194
16195    Paragraph closeUp=new Paragraph(this) {
16196    public COBOLMethod run() {
16197            //@COBOLSourceFile("EXAMP11.cbl",28,12)
16198            //DISPLAY "END OF TEST"
16199            Console.println("END OF TEST");
16200            //@COBOLSourceFile("EXAMP11.cbl",29,12)
16201            //STOP RUN
16202            System.exit(super.__getReturnCode());
16203            return doCOBOLExit();
16204        }};
16205    public Examp11() {
16206            super(new COBOLBytes(13));
16207    }
16208    public void initialize(Program p) {
16209            if(__initialized) return; else __initialized=true;
16210            __setProgram(p);
16211            setA(3);
16212            setB(7);
16213            setC(24);
16214            setD(15);
16215            setW(0);
16216            setX(0);
16217            setY(0);
16218            setZ(0);
16219            setTot(0);
16220    }
16221
16222 }
```

FIG. 16G             -- PRIOR ART --

METHOD FOR TRANSLATING A COBOL SOURCE PROGRAM INTO READABLE AND MAINTAINABLE PROGRAM CODE IN AN OBJECT ORIENTED SECOND PROGRAMMING LANGUAGE

CROSS-REFERENCE TO RELATED APPLICATION

This application claims priority of U.S. Provisional Application No. 61/459,227 filed on Dec. 9, 2010 titled: "METHOD FOR TRANSLATING A COBOL SOURCE PROGRAM INTO READABLE AND MAINTAINABLE PROGRAM CODE IN AN OBJECT ORIENTED SECOND PROGRAMMING LANGUAGE." invented by Todd Bradley KNEISEL et. al.

CROSS REFERENCE TO RELATED APPLICATIONS

None

STATEMENT REGARDING FEDERALLY SPONSORED RESEARCH OR DEVELOPMENT

None

THE NAMES OF PARTIES TO A JOINT RESEARCH AGREEMENT

None

INCORPORATION BY REFERENCE OF MATERIAL SUBMITTED ON A COMPACT DISC

None

BACKGROUND OF THE INVENTION

As well known in the art, a compiler is an important component of a computer system. A compiler performs the machine process of compiling computer programs written in high-level languages such as COBOL, C, C++, JAVA, and the like into machine code executable by the computer system.

Compilers/translators have been developed for translating (compiling) original source code programs written in earlier developed high-level languages such as COBOL into more modern languages such as C, or JAVA. The translation typically takes as input a source program file, such as a COBOL source program, and produces a second program file in a second high-level language such as "C". Another pass of compilation is then utilized to compile the second program in the second language to produce a machine code or executable program file. This two-step compilation approach potentially provides for better portability (running the program on a wider variety of machines) and also for increased performance since more optimized and modern tools and compilers operating on a modern language such as "C" or "JAVA" are available than for older languages such as COBOL.

However, the first translation step typically results in code in the new language that is quite difficult to read or understand, and which when compiled in the second compilation step may produce an executable that hides information relating to the original program. For example, variable names in the original program may not be the same in the translated computer program and a resulting executable and code that was understandable in the first language may translate to code that is difficult to understand in the second language. This obfuscation may require a programmer to expend extra time and effort to carry out debugging and maintenance operations. Further, it makes it necessary to retain copies of the original source code to be retranslated each time a change is made in order to conduct development and maintenance operations.

In general, a COBOL to C (or JAVA) translation process is made difficult because the COBOL language provides for a number of different program variable data types that are not typically directly provided or supported in other programming languages. COBOL data types include integers, and floating point numbers which may in some form be supported in the second language, but decimal numbers (decimal numerics), COBOL style character strings and other commonly used COBOL data types, are not supported directly by the "C" or JAVA programming languages. Descriptions of files with complex attributes are also provided in COBOL and not provided in other languages. Of particular interest in COBOL are decimal numeric variable types since direct support for variables of decimal numeric type are typically not provided in the C or C++ languages, or in the JAVA language. Also of interest is the COBOL character string variable type because, although certain character string data types are provided in C/C++, they are not stored in the same memory format as in COBOL, and therefore are not directly compatible. In COBOL, a character string has a fixed length, whereas in C character strings are stored as variable length strings with a null termination character designating the end of the string. The "C" programming language also provides for character arrays to be declared with each element having a fixed number of characters, but the input/output operations typically interpret the characters within a specific element of the array as null terminated character strings with the fixed number of characters being a maximum length of the strings, rather than a specified actual length. In COBOL, character strings are typically padded with characters representing blank spaces when the actual character string is not as long as the memory provided to store the entire string. With basic differences such as these, a direct translation of COBOL to C presents significant difficulty for many COBOL language constructs, and, in general, translation of the prior art has not in the prior art produced a translated program that is easily readable or maintainable by a programmer.

COBOL, although probably not considered by most programmers to be a "modern" programming language, is still very important to many businesses because the COBOL language has been utilized in development of many large computer business applications that are in still in production use today. However, the COBOL programming language is not commonly taught or used in schools and, as a result, COBOL programmers, especially young COBOL programmers, are harder to find than programmers knowledgeable of other computer programming languages such as C, C++, and JAVA.

Compilers that compile source programs written in the COBOL programming language are also not as common, and may not produce code as optimized as those compilers provided for more common and modern programming languages because there is potentially less market for these compilers. Integrated development environments, debuggers, and other programming tools and program debug tools may not work as of the original high-level language and the original high-level program. For these and other reasons, some businesses have found it advantageous to consider translating certain programs into another language.

The translation of a COBOL source program into a program with basically equivalent functionality as in another programming language, is not a simple task because COBOL has certain features that are not readily mapped (translated) into more common programming languages such as C, C++ or JAVA that results in a form that is easily readable by a human. For example, COBOL provides for definition of many and varied data types using "PICTURE" clauses to describe "DISPLAY" variables and these constructs are not found nor easily definable in either the C++ or JAVA programming languages. Additionally, there are no convenient built in data types for supporting variables having the format flexibility of COBOL PICTURE statements in C, C++, or JAVA. This is also true for COBOL file descriptions, and COBOL procedural control statements.

Several prior art compiler tools have been developed for translating an original COBOL source program into other computer languages such as C, or JAVA, but the resulting translated program code produced by utilization of these existing tools suffers from being expressed in a form that is not easily read or understood by a programmer. In fact, the C or JAVA code produced by the existing tools is almost at a level of a machine assembly language, and thus is typically only useful as input to a second compiler for building executable code.

Since improved readability of a translated program would be considered as a desired goal of a translator program, it is important to examine the prior art tools to see why it has not been possible to produce more readable code when translating a program described or written in the COBOL programming language.

One exemplary prior art tool used for translating a COBOL source program written in the COBOL programming language into a program in the "C" language, is an Open Source tool provided by OpenCOBOL.org. Open Cobol.org is a group that is described at the internet website "http://Open-COBOL.org" as follows:

"OpenCOBOL is an open-source COBOL compiler. OpenCOBOL implements a substantial part of the COBOL 85 and COBOL 2002 standards, as well as many extensions of the existent COBOL compilers. OpenCOBOL translates COBOL into C and compiles the translated code using the native C compiler. You can build your COBOL programs on various platforms, including Unix/Linux, Mac OS X, and Microsoft Windows.

The compiler is licensed under GNU General Public License. The run-time library is licensed under GNU Lesser General Public License."

Another similar prior art COBOL to C compiler/translator tool is a "fork" based upon the OpenCOBOL.org compiler that is provided by a French company, COBOL-IT, having an address: 231 rue Saint-Honoré, 75001 Paris, FRANCE and a home website at "http://COBOL-IT.com".

Both the OpenCOBOL.org and the COBOL-IT compilers/translators operate in similar manner to provide as a first step, the translation of a COBOL source program into an intermediate program file in a second programming language that for these two tools is "C". Then as a second step, both compilers provide for building an executable with a selected C compiler, the C compiler provided with the intermediate program file produced in the first step. Examining the intermediate C code typically produced in the first step by each of these exemplary prior art compilers illustrates that the C code, while functionally correct and "compilable" by a C compiler, is not at all easily readable or quickly understandable by a person. The "C" program produced by the prior art compilers is useful mainly as an intermediate file in the two-step compilation process.

That is, in this exemplary prior art, the C code translation of an original COBOL source program is intended to be "read" mainly by a C compiler that is utilized to compile and produce a final executable program file. The translated C code produced by the prior art compilers of COBOL-IT.org and Open-COBOL.org is not intended for use as a computer program that might be read or maintained by a programmer. In fact, as stated, the resulting intermediate C code can be viewed as almost a kind of generic intermediate assembly language in the two-step compilation process, with the second compiler, the C compiler, being utilized to produce a platform dependent executable program file.

Translation of an original COBOL source program into a program in the JAVA language is another alternative prior art approach. A compiler program tool called "NacaTrans" which provides translation of a COBOL program into a program in the JAVA language is available from the "NACA project" that is described at the World Wide Web URL (Uniform Resource Locator) address: "http://technology.publicitas.com/naca/". The NACA project translator program compiler tool is described briefly on this website as follows:

"NacaTrans implements a COBOL to JAVA transcoder engine. It's designed as a compiler, that takes COBOL BMS source files and output is JAVA or XML files. As a compiler, it uses a traditional compiler architecture: lexer, syntax analyser, semantic analyser, generator. All these compilations steps are implemented in the single Naca's Nacatrans module."

The NacaTrans translator deals with JAVA code generation and execution. The generated JAVA code utilizes a syntax that is intended by the developers of the tools to provide for expression of COBOL language properties within the limits of the JAVA language. This is described by the authors as follows:

"The generated code does not look like classical native JAVA and it is not object oriented from the application point of view. This was by design choice, to enable a smooth migration of COBOL developers to the JAVA environment. The goal of the NACA tools was to keep business knowledge in the hand of people who wrote the original COBOL programs."

In order to illustrate the lack of readability discussed above, two exemplary COBOL source program listings for programs named EXAMP1 and EXAMP2 are provided in FIG. 7 and FIG. 12 respectively. The corresponding resulting intermediate program files produced by the two prior compiler tools discussed above are provided in FIG. 8 and FIG. 14. FIG. 8 is a listing of compilation output (in "C") produced by running the prior art COBOL-IT compiler when the "EXAMP1.Cbl" program of FIG. 7 is provided as input to the COBOL-IT compiler. FIG. 14 provides a similar listing of compilation output in the JAVA language produced by running the prior art NACA COBOL to JAVA transcoder with a second example program "EXAMP2.cbl" (FIG. 12) program as input. FIG. 16 also included at the end of this specification provides another example of JAVA code produced by another open source prior art tool named "RES" available on the World Wide Web at the site identified by the URL "openCOBOL2JAVA.sourceforge.net".

It is readily seen from examining the listings provided in FIG. 8, FIG. 14, and FIG. 16 that the exemplary translated C and JAVA code produced by these prior art tools is not nearly as "readable" (understandable by a human) as the original COBOL source code. For example, in the exemplary JAVA code in FIG. 14 and FIG. 16, it can be observed that the variable declarations in both the "C" and the JAVA code are related to the original COBOL variable declarations but are expressed in a form that would not be readily understood by a COBOL programmer without reference to the original COBOL source program. In the same code, it can be further observed that both the JAVA and the "C" computation statements consist of many calls to library methods or subroutines to perform the "work" of the program, and the code for invoking these calls is also not easily "readable" or readily understood by a COBOL programmer.

Thus, even with the original COBOL program source for reference, it would be quite difficult for a programmer to understand either the declarations or the computation statements in either the C code produced by the COBOL-IT and OPENCOBOL.org compilers or the JAVA program code produced by the NACA transcoder. The exemplary code produced from both compilers is not only difficult to understand or read, but it also would be extremely difficult to attempt to modify the JAVA or the C code to make major fixes or to add any major new functionality, that is, to maintain the code. The JAVA code and the C code produced by these prior art compilers is neither readable, nor maintainable.

Further, the method of storing data in memory described in the translated C or JAVA program corresponding to the data described in the original COBOL program is not presented in the same form or organization as would be expected during running of the original COBOL program. This in turn potentially presents or introduces compatibility problems in sharing data on files between a translated program and another (untranslated) original COBOL program.

Thus, it would be a useful improvement over the prior art to provide a machine or machine implemented method for translating an original COBOL source program into a more modern programming language while maintaining readability of the original code. Accordingly, it is an object of the present invention to provide a machine implemented compilation or translation method that overcomes the difficulties of the prior art as discussed above, and that significantly improves on the readability of a translated COBOL program, in both the variable declaration and description sections of the original COBOL program, in the description of files, and also in the related procedural code which describes operations between variables, files and other data of the original COBOL program.

It is a further object of the present invention to provide a machine implemented compilation/translation method that makes it possible to reduce development and maintenance costs and time normally expended in carrying out these activities.

BRIEF SUMMARY OF THE INVENTION

According to the teachings of the present invention, certain inadequacies of the prior art are overcome by providing a machine process for translating a COBOL program into a program in a second programming language, such as C++, in a manner such that the resulting translated program code is easily readable, understandable, and maintainable by a programmer, the readability potentially approaching or even being improved over that of the original COBOL program. Further, it may be found desirable, in certain program environments, for the translated code in the second programming language to be in a form that is readable to a programmer familiar with the language of the original program, that is, the COBOL language and/or to a programmer familiar with the second language.

The improved readability of the translated code obtained by the present invention provides benefit even when the translated code is intended to be read only by a second compiler utilizing a "two-step" compilation process, as just discussed, that translates original COBOL code to an intermediate programming language that is then compiled to produce a final object or executable code. In a two-step process, the closer both the translated code and the final executable code are to the original COBOL program, the easier it will be for a programmer to relate to both variable names and procedural code in the final executable object modules, which is especially important for debugging the running of executables.

As an alternative approach to the "two-step" method of compilation, the improved readability may also enable a programmer or business to choose a "one-time" translation. That is, an approach with the program code produced by the translation method being "readable" enough that the original COBOL program can be "moth-balled" and the newly translated code in the second programming language utilized as a new base for performing future maintenance and making improvements to the program. With a "one-time" translation, a business or programmer is given the freedom translate the COBOL program and then utilize the translated code as "the" code and the basis for all future work, saving the original COBOL source code only for reference making it unnecessary for repeating the translation. This one-time translation approach has further advantage in that it also avoids the requirement of rerunning the first step of the two-step translation process anytime a change in the program flow or specification is desirable or possibly required for making bug fixes or enhancements.

A "one-time" translation approach provides potential for further significant advantage to a business that owns an original COBOL program in that C++ is a more modern programming language, and C/C++ programmers may be readily available to analyze and perform general work on the code without need for training, or at least not as much training as those knowledgeable in the COBOL language. This approach also greatly broadens the choice of tools and compilers available from many manufactures of such software since C++ and JAVA are more popular and more widely supported programming languages.

Providing for improved readability according to the teachings of the present invention requires a detailed consideration of some unique features of the COBOL language and data variable constructs. The standards and language constructs of the COBOL language for various versions of the language are well known in the art. By way of background, a typical COBOL program includes several divisions or sections describing various aspects or functions of the program. Specifically, certain parts of a COBOL program provide for 1) declaration and description of variables, 2) program flow and description of operations between and upon variables, 3) description of files and the attributes and desired handling of reads and writes by the COBOL program from/to the described files. The various pieces or parts of a complete COBOL program are of course inter-related. For example, the "program flow" code describes operations between variables that are described in the declaration section of a COBOL program. Similarly, the precise functionality of reads and writes executed by the COBOL program as described in the program flow section are based upon description of the files and operations on those files described in the file description section.

In an illustrated embodiment of the present invention, a machine or computer system implemented method performs a translation of an original COBOL program utilizing a plurality of object oriented programming features of the C++ language in unique and novel combination to significantly improve readability of translated code over that produced by methods of the prior art. The machine method of the present invention overcomes certain prior inadequacies of the prior art and, in practice of the improved method, provides in illustrated embodiments of the present invention, as an output, translated code with some or all the following characteristics and advantages. Each of the advantages contributes to improved readability and to providing a plurality of the advantages achieved through a novel combination of improvements over the prior art in the underlying approach in translating computer program code in the COBOL language into a second language (exemplary C++). The improvements are obtained by including a novel representation of COBOL variables within objects and in the expression(s) in the procedural code for defining operations between those COBOL variable objects, and through a novel method of creating descriptions of COBOL variables in the second language utilizing descriptive text that is both readable and directly related to the original description of those same variables appearing in the original COBOL program.

First, in an illustrated embodiment of certain features of the present invention, the translated code produced by the machine method according to the teachings of the present invention includes description or declaration of variable types in the translated program that provides description in a textual syntax that is identical to that of a COBOL program. That is, in an illustrated embodiment of the present invention, the syntax of the description of the variable description/declaration used is identical to the complete text and syntax of variable declaration statements in the original COBOL program. In a further illustrated embodiment of the present invention, the textual description produced by the method of the present invention includes text in the syntax of COBOL defining all attributes of a translated variable in a single argument to an object constructor, with the original COBOL variable name utilized as the name of the object in the second programming language. In a further alternative illustrated embodiment of the present invention, the description of attributes of the translated variable includes a plurality of text arguments, each argument being a text string enclosed in quotation marks, the plurality defining all attributes of the translated declared variable, with each of the text strings expressed in the syntax of COBOL. This overall approach in translation has advantage in that it produces variable description "code" in the translated program that is readable, and readily understood by a COBOL programmer, and which because it is in the syntax of COBOL it is easily enhanced or maintained, even in the second language, by a COBOL programmer.

Second, according to a further illustrated embodiment of the present invention, the translated code produced by the machine method of the present invention includes text strings for describing file types and/or code for accessing files in a manner that provides or produces description of files for access by the translated program in a text syntax that is very COBOL "like", that is, directly and closely related to the actual text and syntax of file description statements in the syntax of the original COBOL language within the original source COBOL program.

Third, the translated procedural code produced by an illustrated embodiment of the machine method of the present invention is expressed in a natural and easily readable form by defining operations between variables in mathematical equation form using arithmetic operators in the translated program, such as for example in C++: "+", "−", "/", "*", "%" for addition, subtraction, division, multiplication, and modulo (remainder), respectively. For example, for COBOL decimal numbers described in COBOL PIC statements, "A=B+C/D;" is a mathematical expression using the arithmetic operators "+" and "/" to describe add and divide operations, respectively, on the decimal numbers B, C, and D.

In prior art COBOL compilers/translators, certain mathematical operations between binary numbers (integers) may be expressed in equation form, however, mathematical operations described or defined between common COBOL data types such as decimal numeric types or "Display" variables described or defined by "PICTURE" statements, would, utilizing approaches of the prior art, be translated into a series of calls to C or JAVA functions, routines or methods. This prior art approach in turn often then requires the use of intermediate (temporary) variables in describing complex equations and requires creation of associated variable names that may not be at all meaningful to a programmer or reader of the translated program.

Fourth, according to the teachings of the present invention, readability is further improved by having the variables in the translated program named using variable names that are identical to those in the original COBOL program. It will be noted that certain variable names may not be directly utilized because of language restrictions. For example, the COBOL programming language may allow the use of certain characters in a variable name that are not allowed in the chosen second programming language, therefore forcing the translation of those characters to a different character or characters in the translated program. For example, a "hyphen" character may be translated to an "underscore" character.

Fifth, it is an important advantage/requirement in translation of description of COBOL arrays, structures, and redefined structures according to the teachings of the present invention to provide in the translated program for memory allocation in storing the content of variable data within these arrays and structures that is identical in memory layout, or very, very close to the layout expected for the original COBOL program. As shown in certain illustrated embodiments of the present invention, this requirement is met while still providing the previously described advantages of 1) using mathematical equations, and 2) using variable names that are identical to the original COBOL variable names.

Translation of COBOL code into a second programming language in a manner for providing two or more of these advantages presented just above is described below in discussing several illustrated embodiments of machine method or methods of the present invention.

In an illustrated embodiment of the present invention, certain object oriented programming techniques are utilized to implement features that provide one or more of the above-described advantages, when an object oriented programming language is chosen as the second language of the translation. Translation of a COBOL program into an object oriented program which provides such advantages is not straightforward, and it is important to note that the typical techniques of applying object programming have not been attempted to be combined in the prior art to provide a translation from COBOL because of some unique, strict, and varied requirements of COBOL. These object techniques are described herein relative to C++ being chosen as the language of the second or translated program. One skilled in the art would readily recognize that one or more of the techniques utilized in implementing the method of the present invention could also be utilized when an object oriented programming language different than C++ is chosen for the translated program.

One or more of these advantages are achieved in part in illustrated embodiment of the present invention by performing a step of translation which generates references to "objects" which describe and reference COBOL variables within the translated program, and further by providing text descriptions of mathematical operations based upon the definition utilizing operator "overloading", described and implemented through the use of a run time library that performs the designated operations between objects expressed in mathematical equation form. That is, the run-time library performs the required mathematical operations between these "COBOL" type variable or file objects. In an object oriented embodiment of the present invention, the method includes a translation step that performs the function of naming "objects" using names taken directly from the original COBOL program and having the data content of those variables referenced from within each of the COBOL variable objects. Further object oriented techniques are implemented by the method of the present invention in generating in the translated text utilized resulting from run-time parsing and interpretation of COBOL variable description, file description and other COBOL constructs included in the original COBOL program, each contributing to and providing for increased readability in the translated program code.

Certain ones of the following steps and techniques included in the present invention method of translation required for achieving one or more of the advantages described above include one or more of the following steps followed or utilized in translating an original COBOL source program into a translated program in a second object oriented programming language. According to the teachings of the present invention, the translation steps that may be included in the method of the present invention for providing such advantages include one or more the following machine steps:
1) generating references in the translated program for accessing an object oriented run-time library;
2) generating in the translated program, code for allocating memory for storing the data content of COBOL variables specified in the original COBOL program;
3) generating in the translated program, code for instantiating COBOL variable objects with the names of those COBOL variable objects equivalent to (or very closely related to) variable names in the original COBOL, the code for instantiating COBOL variable objects and the code for allocating memory for storage of data content of the COBOL variables optionally being included within the same code;
4) including in the code for creating COBOL variable objects, text description in the syntax of the COBOL programming language of the attributes of those COBOL variables specified in the original COBOL program, the text description in the COBOL syntax COBOL being parsed either at compile time or at run-time by code contained in an associated run-time library;
5) generating in the procedural code of the translated program, code for performing operations between those COBOL variable objects, the operations between COBOL variable objects described using mathematical notation, the use of mathematical notation in the procedural code of the translated program being enabled by operator overloading described in the run-time library;
6) generating in the translated program, code for describing attributes of files, the attributes of files determined from file description information in the original COBOL source program, the code for describing attributes of files including text description in the syntax of COBOL of the attributes of the files, and information for referencing the run-time library which provides for parsing of the text description in the syntax of COBOL at run-time.

Certain of the above steps may rely upon provision for and reference to a an object oriented run-time library, the object oriented run-time library being referenced by the generated code of the translated program and providing at run-time the description, processing, and creation of the COBOL variable objects, and associated methods and operators. After the creation of these objects, the library performs the processing of operations between these COBOL variable objects. This processing related to these COBOL variable objects utilizes:
1) code for parsing and processing the text description of "COBOL" variables in the translated program, this text description being specified in the syntax of the COBOL language;
2) code for parsing and processing the text description of files in the translated program, this text description being specified in the syntax of COBOL;
3) code for creating COBOL variable objects that include COBOL variable attribute storage that allocates/provides storage for description of the COBOL variables;
4) code for storing attributes of files accessed by the translated program based upon the parsing and processing of the text description of the files in the translated program;
5) code providing reference to storage in memory space of the translated program to data content of the COBOL variables; and,
6) code for performing operations between or upon one or more COBOL variables through object oriented methods and/or operators referenced or specified from within the translated program.

It will be noted with reference to the discussion immediately above that the terms "COBOL variables" or "COBOL files" refers to the description of the variables and files found in the original COBOL source file, which are translated by the machine method of the present invention into related descriptions of those files and variables in a translated program. That is, "COBOL variables" in the translated program refers to variables described in the translated program that are directly related to the original COBOL variables in the original COBOL source program(s).

It will be further noted, as an option in an illustrated embodiment of the present invention, that the memory allocation/layout for data content of COBOL variables is arranged in a manner identical to (or very similar to) the manner in which memory would be allocated for those COBOL variables by a compiler during the compilation of the original COBOL program. This is a very important aspect or feature in certain applications of the method of the present invention such as when the variables are contained within a COBOL structure, or redefines structure, or an array. Maintaining a memory layout during compilation by a second compiler of the translated program that is identical or at least very similar to that resulting from compilation of the original COBOL source program is of paramount importance and indeed regarded as a requirement for sets of programs which may share reference to data in memory between a "translated" program and a non translated program, or for reading blocks of data from a file that has been previously written by other programs, either COBOL programs or other programs which share data structures with COBOL programs.

In particular, the creation of objects for describing COBOL variables requires several special considerations in order to enable practice of the steps of translation method described above according to the teachings of the present invention. In an illustrated method of the present invention, a special memory allocation approach or procedure is utilized for allocating memory space for 1) variable content, and 2) directly related variable description objects. This special memory allocation approach/procedure described herein enables storage of variable content in the same manner as an original COBOL program while still enabling use of object oriented programming techniques to achieve further readability improvements. First, according to the teachings of the present invention, for data content within a table, or array, or structure, allocation of the variable "content" is provided within "contiguous" memory such that the data within is allocated in a manner identical, or substantially equivalent to that provided by a prior art COBOL compiler. Second, allocation of memory is performed sequentially in the same order as that which would be provided by a prior art COBOL compiler where required for achieving compatibility of memory layout within COBOL arrays, tables or structures. Third, a special object oriented approach is utilized that uses objects to reference and describe the "type" of data, but in the case of the present invention, the data itself is not stored within the memory space of the objects created to describe the attributes or characteristics of that data, as is typical of data "hidden" within objects of the prior art. According to the present invention, a reference pointer is instead provided for referencing the data "content" in memory. More specifically, the "COBOL" "data" is stored in a first memory space, and the objects that describe and "point" to the data are stored elsewhere in a second memory space. (The word "object" interpreted to mean an "object" in the sense of an object oriented program).

For example, consider a COBOL structure that includes five decimal numeric data items, each of which is a decimal number with eight 8-bit digits. Relative to the decimal data, according to one illustrated embodiment of the present invention, memory is allocated to store the five decimal numbers in eight consecutive 64-bit memory locations. Each 8-bit digit would occupy one "character" location, and each of the numbers would be aligned to start on a 64-bit word boundary. The second memory space is used to contain the "objects" which describe the attributes of the five decimal numbers, with the memory for containing this description being located elsewhere in the overall memory space of the translated program. That is, the decimal numbers are located in one "contiguous" memory space, and the descriptive objects describing characteristics of the decimal numbers are stored in a separate memory space. This is not to say that the first and second memory space are not "in" the same computer system or computer program, but that the decimal numbers are not stored as part of the object or within the object, but are stored in a separately managed memory space.

This approach of the present invention enables structures or blocks of items within structures, specified in the COBOL program, to be written to files or copied from one block of memory to another without regard to memory boundaries for specific items or elements of data within the structure. For example, a COBOL program may write a "record" to a file, which would cause a plurality of items within the structure to be written all at once, and later that same data might be read back into the same or another COBOL program as a "block" of data which fills the structure.

The technique or feature of storing data items separate from the objects that describe the "type" or attributes of the data is an important aspect of certain illustrated embodiments of the present invention. Using the "objects" to describe the data, enables the processing of the data to be described in human readable form and enables the use of mathematical notation for certain operations, that is, for expressing operations in "equation" form. Maintaining the data itself in a separate memory space also enables the data to be stored in memory in a manner that is compatible with the original COBOL program and also compatible for sharing with other programs which have not been translated from COBOL into a second language. Further, this approach enables the data to be handled in the same manner as in the original COBOL program with regard to structures, tables and arrays, and with regard to writing "blocks" or memory data within structures to a file or other areas of memory.

It will be further noted that while in one embodiment of the present invention the "run-time library" referenced above may be implemented as a DLL or "library" file, other packaging or compilation procedures could be readily utilized or selected or designed by one skilled in the art of computer programming, without departing from the teachings of the present invention. For example, the source code for the run-time library or parts of the run-time library could be provided in source form, compiled, and then linked with the translated program during start-up of the translated program.

The above described steps and description are intended to provide a general overall understanding of several aspects of the present invention without any implication or limitation being implied that all of the steps or attributes of each step are required to practice certain embodiments of the present invention. Further, in certain embodiments developed by those skilled in the art for practicing the teachings of the present invention, it may be determined that certain steps described above may not be required, and for that additional steps may further be required.

BRIEF DESCRIPTION OF THE SEVERAL VIEWS OF THE DRAWINGS

The subject matter of the invention is particularly pointed out and distinctly claimed in the concluding portion of the specification. The invention, however, both as to organization and method of operation, may better be understood by reference to the following description taken in conjunction with the subjoined claims and the accompanying drawing in which:

FIG. 5 illustrates according to the teachings of the present invention, the translation with the computer system of FIG. 1 controlled by a controlling program, of COBOL source program File Description statements describing attributes of a file, report file, or printout into a translated computer program in an object oriented programming language, the translated computer program including calls/invocation of Constructors, the calls to the Constructors including text in readable form expressing as in the COBOL language, a description of the attributes of the file, the Constructor allocating and initializing in storage of the computer system memory space for storage of the attributes of the file;

Figure 1:
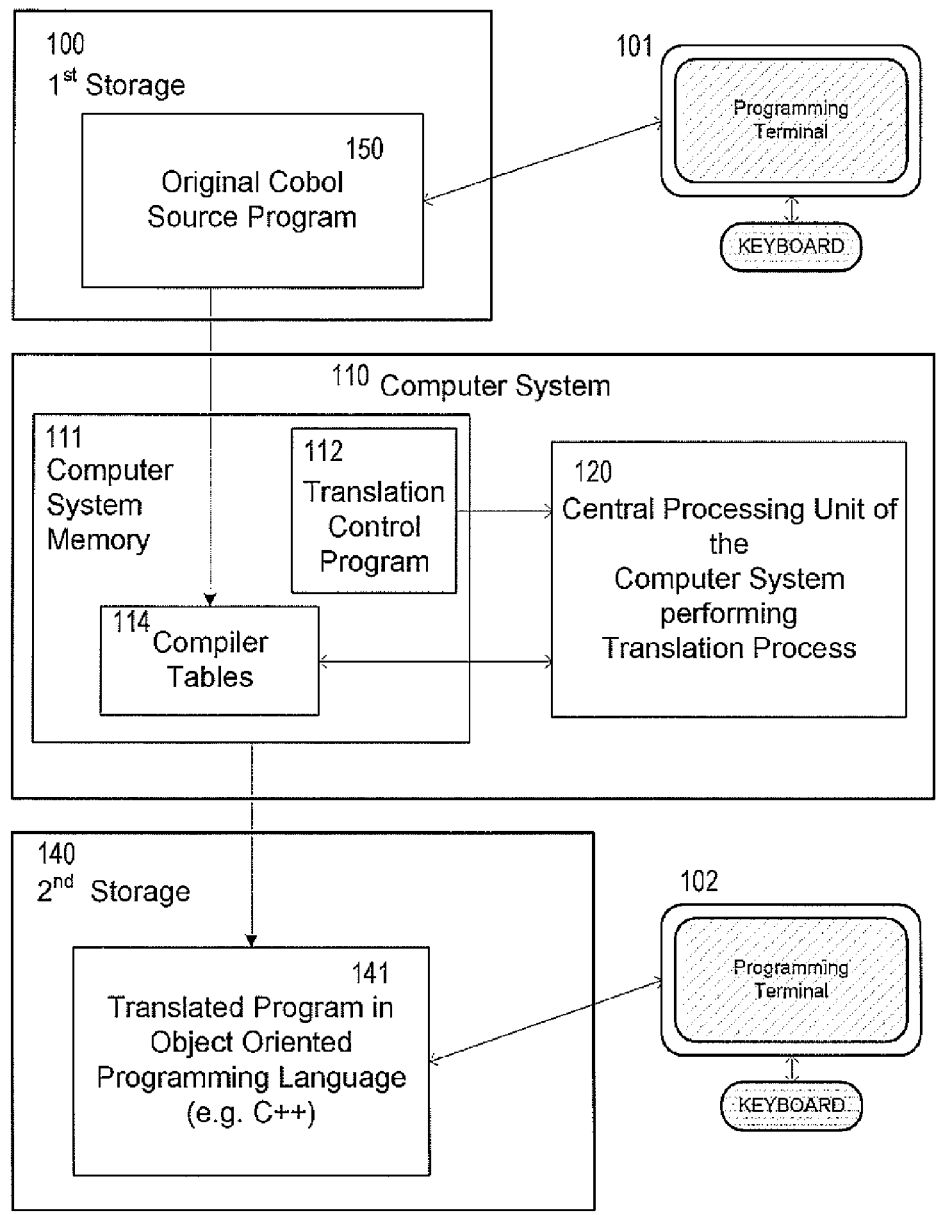
FIG. 1 illustrates a computer system for implementing the method according to the teachings of the present invention wherein the computer system operatively couples and has access to first and second storage and comprises a central processing unit operating under the program control of a translation control program used for translating a COBOL Source Program into a Translated Program in an object oriented programming language, the translated program being in human readable form, and the computer system further including a computer programming terminal for enabling a programmer to optionally edit the COBOL Source Program and the translated program using the same or another computer programming terminal.

In addition to the above referenced Figures, several program listings are illustrated in the following Figures having multiple sheets that are a part of the Specification and discussed in the Detailed Description of the Invention:

FIG. 7 is a source program listing of a first COBOL program named EXAMP1.cbl, the program used as a first example program for the illustration of COBOL program source for translation into a second programming language;

FIG. 8 is a "C" program listing, for reference as exemplary "C" code produced using a prior art tool from COBOL-IT company, the input to the translation process being the EXAMP1.cbl COBOL program of FIG. 7;

FIG. 9 and FIG. 10 are exemplary "readable" C++ program code used for illustration of a possible translation of the EXAMP1.cbl program into "C++" program source code using one or more steps of an illustrated embodiment of the present invention; wherein FIG. 10 provides a method of allocating memory during processing of a Constructor that is more concise than the approach illustrated in FIG. 9;

FIG. 11 is a partial listing of exemplary program code illustrative of C++ code providing a CLASS description, a CONSTRUCTOR, a DESTRUCTOR, and an Overloaded Operator in a simplified example of code utilized according to an illustrated embodiment of the present invention;

FIG. 12 illustrates the source code of a second exemplary COBOL program, the program named EXAMP2.cbl;

FIG. 13 is a listing of output obtained from running the exemplary COBOL program source file EXAMP2 of FIG. 12;

FIG. 14 is a "JAVA" program listing, illustrating exemplary JAVA code produced using a prior art tool wherein the input to the tool translation process is the EXAMP2.cbl COBOL program of FIG. 12;

FIG. 15 illustrates a second exemplary "readable" C++ program code produced from a possible translation of the EXAMP2.cbl COBOL program of FIG. 12 into "C++" program source code using one or more steps of an illustrated embodiment of the present invention, this translation illustrating a translation that may be preferred with regards to memory allocation in comparison to the translation listing illustrated in FIG. 9; and, FIG. 16 illustrates a "JAVA" program listing, for reference as second exemplary JAVA code produced using a prior art tool available on the World Wide Web (Internet) from http://openCOBOL2JAVA.sourceforge.net/wherein the input to the translation process is similar to the EXAMP2.cbl COBOL program of FIG. 12.

DETAILED DESCRIPTION OF THE INVENTION

The following is an overview of several illustrated embodiments implementing the machine method of the present invention and provides exemplary translation examples utilizing selected aspects described in connection with certain embodiments of the present invention.

As background, it is to be noted that in the following discussion the term "translate" as in "translating COBOL to C++" or "translating a line of COBOL code to one or more lines of JAVA code" is meant to be interpreted in referring to the work of a typical computer program compiler or translating program which reads a computer program, processes it, and produces output such as an object file, a translated program file, an executable file, or some other representation or analysis of the input computer program that was read. Computer program compilers and/or translators have been developed using well known methods and tools such as "Lex" and "Yacc" which were part of the original Unix system, and now with versions named Flex and Bison from Gnu Software Foundation, freely available on the World Wide Web from many places and at the following URLs: "www.gnu.org/software/flex" and, "www.gnu.org/software/bison", respectively. There are also custom compilers used for compiling COBOL programs which may use proprietary approaches and tools, but which function in the same general way. The COBOL programming language in general is quite difficult to parse using standard tools, but techniques for parsing COBOL are known or could be developed by one skilled in the art of compiler design.

Compilers typically read, parse, and build in memory a tabular representation of the input program. A computer program compilation or translation process (or step) typically processes and augments those internal tables contained in memory of the computer system, which represent the input program, and then after further processing and analysis produces the desired output, the output typically written into memory of the computer system on which the compiler is run, or written to a file accessible to that computer system. There are of course many variations on this process that are known or easily derived by one skilled in the art of compiler development. A specially designed (or customized) compiler/translator may be utilized in performing certain steps of the method or methods that are an important part of the present invention. It will be appreciated by those skilled in the art that it would straight forward to customize a standard compiler/translator to perform those steps important in implementing the method or methods utilized for practicing the teachings of the present invention.

In the following description of certain illustrated embodiments of the present invention, exemplary reference and description is made with the assumption of C++ as the second programming language, or programming language of the translated program. It is to be noted that other object oriented programming languages such as JAVA could also be chosen or used as the language in which the translated program is produced and hence, the practice of certain aspects of the present invention utilizing other programming languages would be apparent to those skilled in the art.

As indicated above, it would be a further advantage to COBOL programmers to include in the translated code (the translated program "code" itself, not the comments within the translated program) description of variable declarations in a manner equivalent or directly related to constructs of COBOL in the original COBOL source program. In a similar manner, other COBOL code constructs such as descriptions of file attributes and file types can be greatly improved in readability if provision is made to accommodate in the translated program, descriptions of those constructs in C++ in a manner equivalent or directly related to the original COBOL constructs.

In an illustrated embodiment of Applicants' present invention, object oriented features of C++ are utilized by a machine implemented method that provides for translation of a COBOL program into a translated program in C++ having readability that is greatly improved over the prior art. This translation is provided by certain illustrated embodiments of the present invention while still maintaining in the translated program, compatibility in the memory layout of variable data during execution of the translated program with the memory layout of that same data as when running the original COBOL program.

In a further illustrated embodiment of Applicants' present invention, further object oriented features of C++ are utilized in the machine implemented method of the present invention to provide in the translated program for expression of mathematical operations in equation form, this manner of expression enabled by describing operations between objects referencing variables based upon operator overloading specified in a special object library. It is to be noted that support of the language feature described as "operator overloading" is not necessarily supported directly in standard versions of the JAVA language, although this feature may be supported in certain implementations and/or in the future. Operator overloading can also be provided by a preprocessor of a JAVA source program file, the preprocessor recognizing operators and variables in a mathematical syntax within the JAVA source code and translating those mathematical expressions to a standard JAVA syntax that invokes methods. Further description of operator overloading for an object oriented language/program such as C++ is readily available on the World Wide Web, or in books on the C++ programming language.

In a further illustrated embodiment of the present invention, other object oriented features of C++ or JAVA are utilized in a machine-implemented method for describing variables in the translated program originally described in a text string defined in the original COBOL syntax.

In a further illustrated embodiment of the present invention, still other object oriented features of C++ or JAVA are utilized in a machine implemented method to describe files accessed by the COBOL program that are to be described in the translated program using text strings defined in the original COBOL syntax.

An advantage according to one aspect of the illustrated embodiment of the machine-implemented method of the present invention is that the program translated from COBOL into a translated program in a second programming language is expressed in object oriented language form wherein the objects are implemented to reference a special object library. The object oriented program form of the translated program and the special object library enables the translated program to be expressed in a form that is easily readable and understandable by a programmer. It is a further advantage of the method of the present invention to provide a translated program in the second programming language that is in a form suitable for maintenance and further development without need of having to reference the original COBOL program. In a generalized manner, the translated program in the second programming language is also in a form that provides for description of COBOL constructs and COBOL variable types with support for that description being provided at run-time by the special object library.

It is a further advantage for the machine implemented method of the present invention to enable the allocation of data of the declared variables described in the translated program in memory in a way that enables such data to be shared with other programs, subprograms, or libraries that access that data in the original COBOL program memory format. This capability further enables memory allocation of structures, arrays, and memory referenced by "redefine" statements in the original COBOL to be mapped in memory in a manner compatible with that of the original COBOL program. This allocation of memory of data provided by the machine implemented method of the present invention either can be described directly in the translated program for processing during compilation of the translated, or allocation of memory for data can be performed at run time using object constructs commonly called "constructors" contained in a run-time library. The allocation of memory for descriptor objects which describe and reference (point to) the data can also be done at compile time (compilation of the translated program) or at run time (during execution of the translated program).

In an illustrated embodiment of the present invention, a machine-implemented method of translation is performed in a manner that provides these discussed features.

First, according to the method of the present invention, memory structures are provided in C/C++ programming language which allocate a desired "amount" of memory (number of bits, bytes, or words). For example, a specific number of characters within memory can be allocated by declaring a variable as an array of characters. The starting position of these data types within physical memory boundaries can also be defined by specifying alignment of the data with respect to words, bytes, pages, blocks or other memory sizes relating to real or physical memory. Utilizing standard C/C++ or JAVA language constructs, or extensions to the constructs, the method of the present invention provides for the allocation of memory space in a memory storage format identical, or at least almost identical, to the memory format assumed by a COBOL programmer. That is, the method of the present invention provides that C++ or JAVA variables can be defined or described that provide for data to be allocated in memory matching the size and alignment of the original COBOL variables in memory and their related memory storage format.

Second, using an object approach of the present invention, the method provides that the description of each of the data variables is defined as an object that describes the characteristics of the data variable. It is important in implementing the method of the present invention that the data variable itself, and the description of the data variable be separated in memory, and that the descriptor object which describes the data variable comprises or includes a pointer which points to the storage location of the data variable itself, in addition to including information describing the characteristics of the data variable. That is, according to the method of the present invention, the data of the variables is described and located in a first memory space of memory, the first memory space being separate from a second memory space. Also, according to the method of the present invention, the objects describing the data, are located in the second memory space and that each object in the second (object) memory space which describes the data includes a pointer pointing to the first memory space which is the memory space of the data itself. COBOL variables that are part of an array or structure are allocated memory by the method of the present invention in the first memory space in a manner (ordering and spacing) either identical, or directly related to what allocation would be expected to take place in the original COBOL program.

Third, according to the method of the present invention, an object class is assigned which provides for operations between variables with these COBOL data types. That is, operations between descriptor objects which describe and reference the data variables is provided for in a technique or mechanism called "overloading" (in C++) that defines and enables the mathematical operations between the data referenced by the objects to be described in mathematical equation form. Further, Input/Output operations can be defined for these objects (COBOL variable objects) that allow the displaying of the data identified within the objects in a desired human readable (print) format, that is, in the format specified in the original COBOL variable declaration. That is, the data variables are declared in structures in a manner that is similar or identical to the original COBOL memory allocation, objects are generated which describe characteristics of the data variables, and then operators are used for expressing the mathematical operations taking place between these data objects. It is important to note that the data variables and the objects describing these objects are specified or defined in such a way that in the data variables and the objects describing those data variables result in being stored in separate memory regions. It will be understood that the data variables are separated from the description storage in the objects to allow for mapping the data variables into memory in a manner similar to the original COBOL, and to further provide for access of structures, arrays and "redefine" memory constructs that are provided in the COBOL language.

Creating an object in C++ is typically done at run time or initialization time by a constructor operation, which creates an object that describes and stores a variable of a defined type. Typical prior art objects in C++ provide for the storage of the actual data of an object "inside" the object, that is, hidden from view from outside of the object. The data of the object is "hidden" from the programmer and made available only by accessing code within the object that "provides" the data. A C++ object typically also contains within it, a description of the characteristics of the stored data, such as the length or type of the data. This approach typically provides advantages to the programmer in that the data within the object can only be manipulated by the programming code provided with the object, and cannot accidentally accessed by other code.

However, this precise approach is not suitable for providing certain advantages of the present invention because keeping the data within an object would prevent compatibility of memory storage allocation with the original COBOL program or in sharing the data with other COBOL programs or routines. That is, the "normal" approach of C++ used in defining and allocating storage for objects is problematic for the storage of COBOL data variables because in the COBOL language, the storage of data variables is typically assumed to be sequential or contiguous in actual memory and corresponding to the order in which variables are declared in the COBOL source program. This is also a requirement in COBOL for the proper allocation of memory for variables within arrays or structures.

The COBOL language also provides for redefining the base of a second structure to be overlaid in memory relative to the definition of a first structure. For example, structure A can be declared, and then structure B can be declared as "redefining" structure A, meaning that structure B and structure A share the same memory space and provide two alternative declarations (descriptions) of how to view the data within that memory space. For example, a string of four 8-bit characters could also be accessed or viewed as a 32-bit binary integer number. As a second example, a string of four 8-bit characters could be accessed or viewed as a decimal number with four decimal digits, or in "packed form" (4-bits per digit) four 8-bit characters could also describe 8 decimal digits (two per 8-bit byte).

The precise and predictable nature of the memory storage format for COBOL data types requires that in the translated program, the memory space be allocated such that data storage space for each data item is allocated sequentially in the same order that the variables are declared within the original COBOL program, AND, that the data is stored in a manner identical or at least predictable in comparison to the allocation of memory in the COBOL program when compiled by a typical COBOL compiler.

In order to solve or merge these two apparently conflicting approaches, according to one illustrated embodiment of the present invention, the memory space for defining an object is created in a memory space separate from the memory space used for storing the actual data of the COBOL variable(s). This enables the memory space of the data itself to be arranged (allocated) in a manner identical (or at least very similar) to that of the original COBOL program. The "objects" provide pointers to the data in its separate memory space, in addition to storing within the object a description of the data of the object. That is, a COBOL variable constructed in one exemplary approach illustrative of one embodiment of the present invention allocates memory for the variable in a normal manner, and then creates an object that describes the object and also provides a pointer to the data of the object. That is, the data is not stored "within" the object, but instead the object provides a pointer (or any other memory locator) "to" the data itself. A "constructor" which creates the memory of the variable may be used to allocate the data memory itself, or the data memory can be declared in a normal fashion, and the constructor that creates an object that describes the data is provided with a pointer to that data item.

This approach allows the C++ code to be expressed in an improved manner in comparison to the approach of the prior art using the C++ technique called operator overloading. For example, adding two decimal numbers in COBOL in response to the COBOL statement "COMPUTE A=B+C−D" are generally, in the prior art, translated into a series of subroutine calls to a library that provides for decimal arithmetic (since decimal numbers are not directly supported in "C").

That is, for example, a series of subroutines calls such as the following would be used to provide the desired operation:
Example code sequence:

```
//(with appropriate variable type declarations of A, C, D, & temp1 )
   _decimal_subtract( temp1, C, D );
   _decimal_add( A, temp1, B );
```

For this simple example, this code sequence could be viewed as not being easily understood or user intelligible. The method of the present invention can be used to produce code that is much more user intelligible, that is, code that is highly or more readily understandable to a user in terms of what operations the compute is being instructed to perform by such COBOL statements.

According to the teachings of the present invention, objects are created to describe and point to the decimal numeric variables A, B, C, and D, the C++ code for performing the desired computation that result in producing corresponding statements that appear almost in the same form as the original COBOL code. That is, the following COBOL code:

"COMPUTE $A=B+C-D$"

could be translated into C++ code that reads:

"$A=B+C-D$"

where "A", "B", "C", and "D" are not data items, but are objects which describe and point to the actual data items, the data of the variables being stored separately from the descriptive data of the object.

This method produces translated code that is significantly more user intelligible code in comparison to the prior art example series of subroutine calls given above. For more complex COBOL source programs, this improvement in user intelligibility can be much more significant or dramatic, and when the complexities of COBOL such as the handling of errors, and input/output operations are considered, the code generated by practicing one or more aspects of teachings of the present invention are found to be much more concise and readable.

Thus, utilizing an object oriented approach for defining and constructing COBOL variables in C++ in which the data is separated from the object, pointed to by the object, and stored in a "normal" manner similar to that of the original COBOL program, a method of translating COBOL to C++ can be implemented according to the teachings of the present invention which provides for C++ code that is much improved in readability over the prior art. With this approach, the readability of the C++ code can be improved to the point that a programmer could and probably will choose to discard the original COBOL source program (probably not "discarding" but setting aside) and make a translated C++ version of the original COBOL code the basis for future maintenance and improvement of the original COBOL program.

These objects which describe and point to COBOL like data variables, and are named in a manner directly related to the original COBOL variable names, enable mathematical expressions to be used which are in mathematical equation form, and which use variables identical or directly related to the original COBOL variable names. (By being directly related, translations such as translating a hyphen to an underscore and other simple direct modifications are provided, but the variable names remain as much like the original COBOL variable names as possible, for the purpose of improved readability.

According to a further illustrated embodiment of the present invention, it is shown that it is further advantageous for these objects to provide operator interface to normal C data types. For example, a decimal numeric COBOL variable provides an operator interface that produces a result when a "C" integer (such as "int" or "long" or "long long") when the decimal numeric operand is one of the operands in an operation such as "add" or "subtract" ("+" and "−" respectively).

In a further illustrated embodiment, it is shown that it is advantageous for the constructors that create COBOL data types in the translated program to be provided by a description of the data type in a form directly related to the variable declaration statements as they might appear in the original COBOL program. That is, the constructor provides the capability for parsing a text string (or strings) that describe the data type in the same or similar format as a COBOL variable declaration statement. For example, a COBOL declaration of:

"xxx PIC S999.99"

in the original COBOL program could be provided to an object constructor in the C++ programming language as:

'COBOLDisplayVariable xxx ("PIC S999.99");' which would describe a COBOL variable named "XXX" with type characterized by the PIC (PICTURE) statement "PIC S999.99".

It is to be noted that the approach of processing a complete representation of the original COBOL "PIC" statements provides significant improvement over the approach used in the prior art NACA COBOL to JAVA translation tool. The advantage of the above approach can be seen in from the comparison of the following lines of JAVA translated from COBOL by the NACA tool in the illustration of the declaration of a variable characterized with a PIC statement. The original exemplary PIC statements are provided as comments next to the JAVA code in the following JAVA code example:

```
Var z    = declare.level(1).pic9(1).valueZero( ).var( );      // 01 Z PIC 9 VALUE ZEROES.
Var y    = declare.level(1).picS9(2,1).valueZero( ).var( );   // 01 Y PIC S99V9 VALUE ZEROES.
Var d    = declare.level(1).pic9(2).value(15).var( );         // 01 D PIC 99 VALUE 15.
Var y_E  = declare.level(1).pic("+99.99").var( );             // 01 Y-E PIC +99.99.
Var d_X  = declare.level(1).redefines(d).picX(2).var( );      // 01 D-X REDEFINES D PIC XX.
```

In these exemplary JAVA code statements illustrative of translation by the NACA tool of COBOL source code, the attributes implied and/or specified by the PIC statement are provided as constants or values as attributes of the declared variable in a less readable manner than the text of the original COBOL program. With this approach, a programmer desiring to modify the JAVA program for maintenance or improvements would be required to know and understand the JAVA classes and syntax necessary to declare a variable, using a new or different approach that is quite dissimilar to the syntax and approach used in original COBOL program. Utilizing an approach supported by a run-time library in an illustrated manner of one embodiment of the present invention provides for the run-time library to interpret "complete" COBOL PICTURE statements with the PICTURE statement being written in the same manner as it would be written for a COBOL program. With this improved approach, a programmer making enhancements to a translated program or adding significant functionality to a translated program can write "new" code which utilizes COBOL type variables and describes those variables in the manner of COBOL rather than requiring that the programmer be aware of the details of how classes of objects are implemented, in either JAVA or C++.

It is to be noted that utilizing a run-time constructor in C++ moves the determination of a variables type and allocation of memory for storing that variable from a compilation time determination to a run-time determination. This in turn implies that the parsing of the PIC string and the allocation of memory for storage of data related to the object may also be done at run-time rather than at compile time. In order to maintain compatibility with memory storage allocation and the ordering of the original COBOL program description of variables, and for compatibility in sharing memory with other programs, this memory allocation at run-time must be done as the original memory allocation was previously done at compilation time. It also may require that the storage of any descriptive information included in the object created by the constructor for describing the "type" of the variable be separated in memory from the memory storage used for the actual data of the variable itself, otherwise variables that were originally contiguous in memory would not necessarily be allocated contiguously at run-time because of intervening storage allocation for the description of the type of variable. (This is discussed in more detail later herein, with specific reference to COBOL arrays, structures and redefines).

In a manner similar to the method described for translating COBOL variable declarations into C++ or JAVA program code, with support from a special object library, further advantages of the present invention in readability and maintainability are achieved by providing a constructor which processes the description of files (file types) in the syntax of COBOL (at run-time). That is according to the teachings of the present invention, the special object library provides program code and allocates storage for parsing, at run time, a text string in the syntax of the COBOL programming language which describes a file, and then provides support for a file of that type in the translated program in the second programming language.

For example, an exemplary description of a file in the COBOL programming language is as follows:

```
FILE SECTION.
FD MY-OUTPUT-FILE
   LABEL RECORDS ARE STANDARD
   DATA RECORD IS PRINT-LINE
   LINAGE IS 52 LINES
   LINES AT TOP 5
   LINES AT BOTTOM 3.
```

This COBOL source code, as an example, is translated to a call to a constructor which has an argument text in exemplary form such as the following:

```
COBOLFileDescription FD ("MY-OUTPUT-FILE"\
"LABEL RECORDS ARE STANDARD"\
"DATA RECORD IS PRINT-LINE LINAGE IS 52 LINES"\
"LINES AT TOP 5 LINES AT BOTTOM 3");
```

It will be recognized by one skilled in the art that the exact syntax of the code that might be parsed by the constructor could be varied from that specifically allowed by the COBOL language standard while still being COBOL "like" and providing the advantages achieved in one or more illustrated embodiments of the present invention. For example, another format or style which provides for description "as in the manner of COBOL" is as follows:

```
COBOLFileDescription FD ("MY-OUTPUT-FILE",
"LABEL RECORDS ARE STANDARD",
"DATA RECORD IS PRINT-LINE", "LINAGE IS 52 LINES".
"LINES AT TOP 5", "LINES AT BOTTOM 3");
```

The above code might be somewhat easier to parse by the Constructor than the previous example wherein each phrase of the COBOL like description is provided as a separate argument (separated by commas).

In similar manner, translations of other descriptive sections or divisions of COBOL can be provided for support of other COBOL programming constructs. Providing support in the second programming language for descriptive text strings which are identical or at least similar to that of the original COBOL increases the readability and the maintainability of the code in the second language and further in the method of the present invention provides for compatibility in memory between the program in the second language and other programs which may share data.

It is an advantage of a further illustrated embodiment to provide a translation method that includes support for translation of file description phrases in the original COBOL source file into an easily readable form in a second object oriented programming language such as C++ or JAVA. The translation method of the present invention for handling file description and operation in the original COBOL source code provides for combining clauses from more than one section or division in the original COBOL program to enable the building of file description blocks or objects based upon information from two different locations in the original COBOL program, and to provide for ease in the processing performed by the constructor. An alternative method is to translate information from each phrase in the original COBOL source which describes a file, next translate that information into a plurality of constructors, and then to provide code in the run-time library for combining the information to allow the building of a file description block or object from the information assembled from the plurality of constructors. In a manner similar to that described for translating COBOL variable declarations into person/human readable form utilizing a constructor processed at run-time, file description information is translated from the original COBOL source into calls at run-time to a Constructor, the calls including description in readable text form of the attributes of the desired file. The text format accepted by the Constructor is in a form similar to that of the original COBOL to provide for ease of reading, ease of maintenance, and support of features in the COBOL source program not normally provided in the C++ or JAVA languages.

As discussed, the present invention provides a method for compilation and translation of an original source COBOL program into a translated program in an object oriented programming language, such as C++ or JAVA. The method further provides that the translated program be produced in a form that is more readable and understandable by humans than that achieved by prior art methods or programs for translating COBOL programs into a second program into another programming language. In an illustrated embodiment of the present invention, a computer system including a central processing unit, computer system memory, and computer system storage under control of a translation program performs the translation of a COBOL source program by reading the COBOL source program from computer system storage, performing translation steps under control of a translation program, generating code of a translated program in a second computer object oriented language such as C++ of JAVA and writing the translated program into storage of the computer system.

In particular, in one illustrated embodiment of the present invention, objects are generated in the translated program which provide reference to data items. The objects are described in the object oriented programming language and have names equivalent or directly related to names in the original COBOL source program. This enables operations between or upon data described in the original COBOL source program to be expressed in the translated program in "equation form" or as mathematical operations between objects declared and described in the translated program. This enables the generated translated program to be expressed in a significantly more readable, maintainable, understandable, and/or adaptable form than that of the prior art. The method of the present invention provides for generation of a translated program with significant exemplary advantages such as for example:

a) more concise description of program flow;
b) easier to read expression of operations between variables;
c) mathematical expressions between variables in the original COBOL Source program expressed in mathematical form in the translated program, even for variable types not directly supported in the chosen object oriented programming language (second language);
d) enabling allocation of memory space by the translated program in a manner identical or substantially similar to the memory allocation described in the original COBOL source program;
e) enabling memory allocation in the translated program provided in a manner that enables multiple references with a plurality of descriptions of the same memory space as described in the COBOL language using the REDEFINES statement; and,
f) input/output operations with files or memory copies are described such that the translated program in the object oriented programming is described in a manner similar to that in the original COBOL source program.

A further advantage to a programmer or user is that the translated program may be found "readable" enough so that a programmer may choose to modify and maintain the translated program itself for future changes and maintenance rather than "going back" to the original COBOL source to make any needed improvements or fixes. This is in contrast to the prior art, where the readability of translated programs was typically not at a level where that choice would or even could be made.

According to a further illustrated embodiment of the present invention, further advantage is provided in the readability of the translated program. This is achieved by including a provision in the translated program for the description of program elements such as variables and files utilizing text strings as in the original COBOL syntax to describe the attributes of the program elements in the second programming language. For example, the translated program in C++ includes calls to "C++ Constructors" which process text strings provided to the Constructors in the original COBOL syntax, and the Constructors then create objects which describe and/or reference the program elements by parsing the text strings at run time. That is, the files or variables or other program elements are described in C++ within a Constructor using text strings that look like or at least closely resemble the original COBOL description, along with a library which implements the parsing of the text strings within or by the Constructor.

With regards to another illustrated embodiment of the present invention it will be noted that, although much of the above description of the present invention describes computer implemented steps of a method for practicing the invention, the steps of the method could be practiced or implemented by a person or computer programmer performing the steps by hand, that is, translating a COBOL program into a readable and maintainable C++ or a JAVA program by hand based upon characteristics, features, and/or elements of the run-time library. This translation by hand of an original COBOL program to a program into a second object oriented programming language, in practice of the present invention, could include utilizing the syntax of COBOL in the translation of COBOL variable declarations into declarative statements in the second language, and further utilizing references to COBOL variable objects with the original COBOL variable names to express, in the second programming language, equations in mathematical form utilizing arithmetic operators.

In further illustration of the present invention it will be noted that the a user when practicing the invention will typically view the translated output file on a terminal connected to the computer system on which the output file is stored, or will transfer the translated output file to another computer for viewing on a display screen, video monitor or the like. The viewing of the output file provides a display of the translated program in a format and with text resembling the original COBOL program but expressed in the translated file object programming language. For example, a COBOL program translated to C++ will have declarations that quite closely resemble the PICTURE statements in the original COBOL program and the relation will be clearly visible. For program flow statements, the C++ code will be almost a line by line translation, but with the equations and program flow code utilizing C++ object oriented constructs.

DETAILED DISCUSSION OF THE ILLUSTRATED EMBODIMENT

With reference to FIGS. 1 through 16, the illustrated embodiments used for implementing the method of the present invention will now be described in more detail. FIG. 1 illustrates a computer system 110 that operates under control of a Translation Control Program 112. The computer system 110 comprises a Central Processing Unit 120 and a Computer System memory 111, a portion of the computer system memory utilized for storing the Translation Control Program 112. The Translation Control Program performs the functions of controlling the Central Processing Unit 120 and performing steps of a translation process for translating a COBOL Source Program 150 according to the teachings of the present invention.

The steps of the translation perform preparation operations and produce as output a Translated Program 141, the Translated Program being a computer program in an object oriented programming language such as C++ and that is in human readable form. The steps of translation of the method are performed according to one or more teachings of the present invention. As shown, the computer system 110 couples to and has access to first and second storage 100 and 140 respectively. The COBOL Source Program 150 contained in first storage 100 is illustrated as being optionally edited by a programmer using a computer programming terminal 101 included in the computer system 110. The output translated program 141 can be also optionally edited by a programmer using terminal 101 or another computer programming terminal 102 included in the computer system 110.

Figure 2:
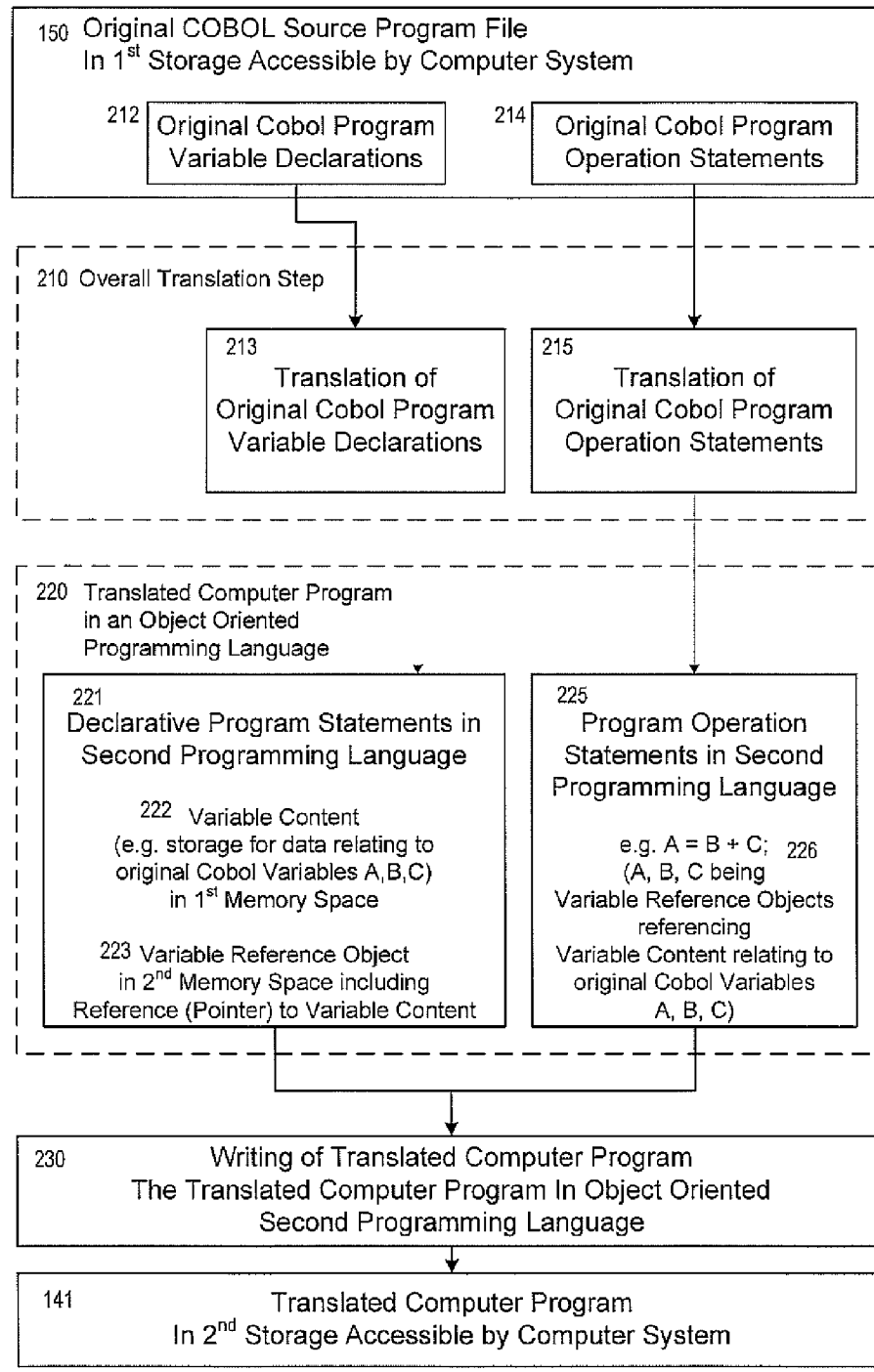
FIG. 2 illustrates according to the present invention, the steps of a method implemented by the computer system of FIG. 1 for translating a COBOL source program file obtained from the first storage accessible by the computer system into a translated computer program in an object oriented programming language, the computer system performing the steps of the translation method and thereby producing a translated computer program in a form readable by humans and storing the translated computer program into the second storage accessible by the computer system.

FIG. 2 illustrates steps of the method according to the teachings of the present invention performed by computer system hardware of FIG. 1 under the control of program 112. As indicated, a COBOL source program 150 contained in first storage 100 accessible by a computer system 110, is read by the Central Processing unit 120 of the Computer System 100 controlled by a Translation Control Program 112 stored in memory 111 of the Computer system, processed, and translated into a translated computer program 220 in the second programming language. The Translated Program 220 in the second programming language is written into second storage 140 by the Central Processing unit 120, the storage 140 being also accessible by the computer system 110. As indicated in FIG. 2, the COBOL program 150 comprises Original COBOL Variable Declarations 212 and Original COBOL Program Operation Statements 214. The COBOL variable declarations describe in detail the characteristics of the variables of the original COBOL program. The COBOL program operation statements describe the program flow of the original COBOL program.

During an overall translation operation 210, the original COBOL source program 150 is translated by the computer system 110 into a translated program in a second programming language C++. The overall translation operation performed by computer system 110 comprises the steps of 1) translating the original COBOL program variable declarations 213, and 2) translating the original COBOL program operation statements 215. The translation of the original COBOL variable declarations 213 by computer system 110 produces Declarative Program Statements in the Second Programming Language 221 (i.e. C++), and the translation of the original COBOL operation statements 215 by the computer system 110 produces Program Operation Statements in the Second Programming Language 225. The translation of the original COBOL operation statements by computer system 110 may result in including references to the original COBOL program variable declarations since the type and characteristics of the COBOL variables may affect how the program operation statements are translated.

Figure 3:
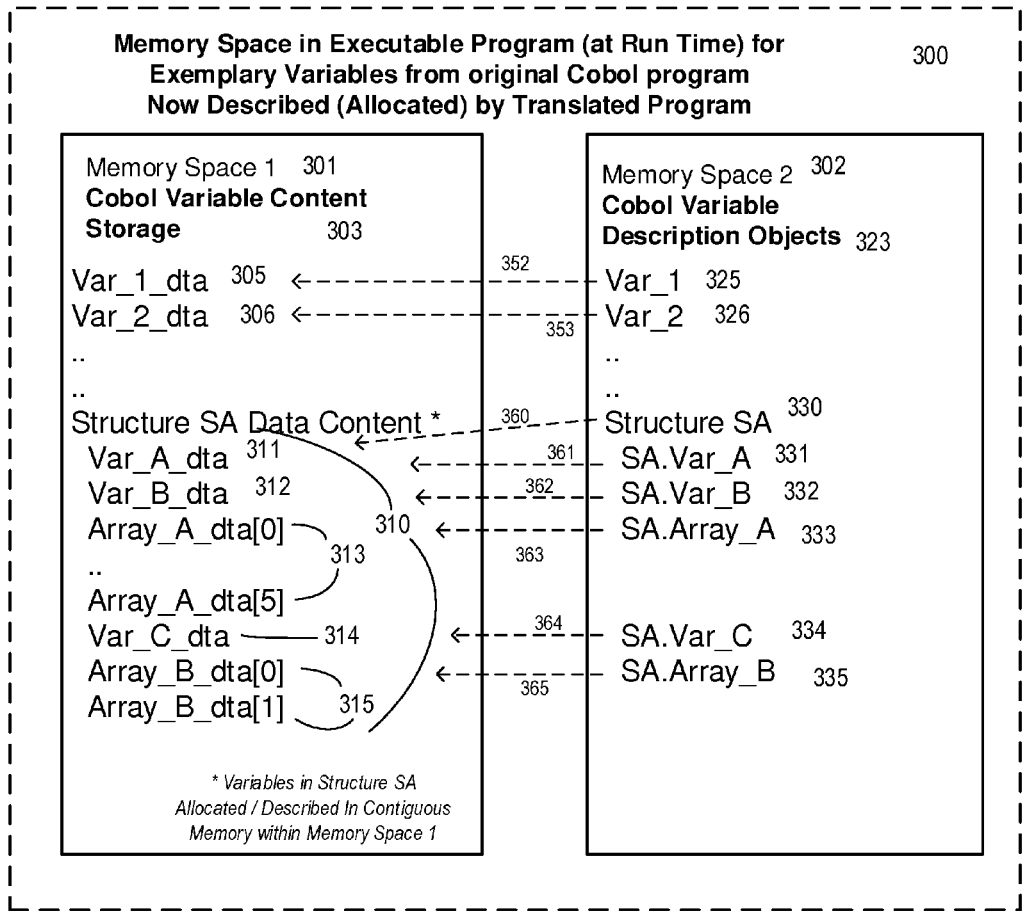
FIG. 3 illustrates according to the teachings of the present invention, the allocation of variables and objects, in two distinct memory spaces of the computer system of FIG. 1, wherein the first storage area is allocated for storing COBOL variable content, and the second storage area is allocated for storing Variable Description Objects, each Variable Description Object including 1) a pointer/reference to the variable content storage, and, 2) descriptive attributes characterizing the variable in manner that is directly related to the descriptive attributes of the original COBOL variable in the original COBOL source program.

In FIG. 2, the Declarative Program Statements in the Second Programming Language 221 and the Program Operation Statements in the Second Programming Language 225 comprise the overall Translated Computer Program 220 produced by the computer system 110, that is in the desired Object Oriented Programming Language such as C++. Each of the plurality of Declarative Program Statements 221 in the translated program includes: 1) text which describes variable content (the actual data of the variable) 222 which is stored in a first memory space, and also text describing or creating a Variable Reference Object 223, which is stored in a second memory space. The first memory space 301 and the second memory space are shown in FIG. 3.

The format for storing the data of a COBOL variable in memory is determined from the text which comprises the original COBOL variable declaration statement 212 which is part of the original COBOL source program 150. As an example, a COBOL variable may be described as: "01 Gross-Pay PIC 9(5)V99 VALUE ZEROS.", which would describe a COBOL variable named "GrossPay" to be stored in memory 100 with 5 digits of decimal precision before (to the left) of the decimal point, two decimal digits after (to the right of the decimal point) and with an initial value of all zeroes. The "V" in the PIC statement describes an "implied" decimal point, meaning that the "." (period or decimal point) is not actually stored in memory, but is "implied", that is, the compiler knows where the decimal point is to be applied.

In FIG. 2, the COBOL Operation Statements 214, also part of the original COBOL source program 150, are those statements which describe program flow and operations of the COBOL program between, upon, and/or with reference to the declared COBOL variables. The COBOL operation statements may also include description of mathematical operations to be performed between or upon COBOL variables with these mathematical operations expressed in mathematical equation form 226. The COBOL operations statements also they may describe condition checking; cause branching from one section of COBOL code to another, and may perform many other operations typical of a COBOL program.

It is to be noted that in one illustrated embodiment of the present invention, the mathematical operations that are part of the program operation statements in the second programming language are expressed as mathematical equations. For certain types of COBOL variables, this manner of expression is achieved by the translation of the original COBOL variable declarations into variable declaration statements in the translated program with those variables being described as objects. The mathematical operations may then be described, in some instances, using mathematical notation that describes operations between objects. Describing operations between objects using mathematical notation is provided in some programming languages such as C++ through the use of "operator overloading" as discussed above. The precise manner translating the variable declarations is important and key to providing translation of the program operation statements in a manner that provides for readable and maintainable program code in the translated program. It is important that both the declarative statements and program flow statements in the translated program be expressed in readable and maintainable form.

After translation, as shown in FIG. 2, the Translated Program 220 is written 230 into second storage 141 accessible by the computer system 141. It is to be noted that the step of writing to second storage is not necessarily performed after all translation steps are complete. The writing to second storage may be performed partially as each COBOL statement is processed, or all of the writing may be done at the end. It is to be noted that both first and second storage 100 and 140 may be disk storage, random access memory, or other types of storage, also the storage may be attached to the computer system 110 or coupled across a network, the use of such general terms to be interpreted broadly.

FIG. 3 illustrates in greater detail, the translation step 213 of FIG. 2 that translates original COBOL Variable Declarations into Declarative Program Statements in a second programming language, such as C++. There are several important aspects or parts of this translation step, each of which provides advantages in terms of readability and maintainability of the resultant translated program code. Certain of these advantages can be practiced independently of the others. But when the advantages are taken collectively, the overall resulting translated program code offers significant improvements in the readability and maintainability over prior art translation approaches. First, it is advantageous to provide for the translated code to describe or enable creation of objects that represent COBOL variables in the translated program. That is, the COBOL variables are represented in the translated program as "objects" not just as a declaration of a simple "variable" in the second programming language. Second, it is advantageous to provide for the storage of the actual data of the COBOL variables to be separated from the fields in memory describing the attributes of the COBOL variable, that is, for example, the attributes of the object describing the COBOL variable. Third, it is advantageous to provide means in the translated code for describing (allocating) the memory space to be utilized at run-time for storage of the data of the COBOL variable in the same manner memory allocation is described and expected as a result of compiling and running the original COBOL program. Fourth, it is advantageous for ordering the memory utilized for the data of a plurality of COBOL variables which are part of a COBOL structure, redefined memory space, or array in the same order to provide the same memory spacing as expected for the original COBOL program. Fifth, it is advantageous to express operations between COBOL numeric variables in mathematical equation form in the second programming language. This is typically achieved by the support of "operator overloading" being provided in a compiler for the second programming language, typically part of C++ program compilers, and not typically provided in JAVA program compilers. In cases where operator overloading is not supported by the compiler, the feature can be optionally provided by components such as pre-compilers, or preprocessors that are cognizant of the syntax of the language being processed.

FIG. 3 depicts an overall memory space 300 of the translated program 300 with the memory being accessible after start-up of the program during execution of the translated program. The allocation of that overall memory space is determined by the translation step of FIG. 2 that generates the description/declaration within the translated program of the translated data variables, each translated data variable being directly related to COBOL variables described in the original COBOL program. In an illustrated embodiment of the present invention illustrated in FIG. 3, variables "Var_1" 325 and "Var_2" 326 are depicted in the translated program as translated from original COBOL variables. Following those variables, depicted are a Structure "SA" 330 containing variables "Var_A" 331, "Var_B" 332, array "Array_A" 333, additional variables "Var_C" 334, and array "Array_B" 335. These variables are described in text of the translated program as generated by the translation step of FIG. 2 to cause at run-time, the allocation of program memory in two separate memory spaces 301 and 302 within the overall memory space of the program 300. As shown, the first memory space 301 is utilized for storage of the actual data of variable 303. The second memory space 302 is utilized for storage of the descriptive attributes of the variables 323, in this example, the attributes stored as objects (COBOL Variable Description Objects 323). For example, for a variable declared in COBOL with the COBOL descriptive text "AAA 01 PIC 99999.99" the actual data could be stored in eight bytes, most likely aligned on a 64-bit word boundary. The descriptive attributes describing the length in digits would be as eight, the number of digits to the left of the decimal point as five and the number of digits to the right of the decimal point as two. The attribute data would further include and describe the data as being decimal numeric data, stored with one decimal digit per byte, with no stored sign and an assumed sign of positive. (This overall interpretation is exemplary for purposes of discussion, and the text for actual compiler may not be strictly interpreted in this manner). As indicated in FIG. 3, the descriptive attributes are stored in descriptive "objects" stored in the second memory space 302, and the actual data (or data content) is stored in the first memory space 301. The descriptive attributes typically stored as an item in an object further include a field in the object for referencing or pointing to the memory location storing the actual data. This is depicted in FIG. 3 by arrows 352, 353, and 360 through 365 pointing from the objects "Var_1" 325, "Var_2" 326, "SA.Var_A" 331, "SA.Var_B" 332, array "SA.Array_A" 333 (the starting location of Array_A), "SA.Var_C" 334, and array "SA.Array_B" 335 ... TO ... (pointing to or referencing) the actual data for those same respective variables 305, 306, 311, 312, 313, 314, and 315 (respectively). That is, each object in memory space 2 contains the attributes describing the data, and also a pointer or reference element which enables locating the actual data itself in memory space 1 (301). The data in memory space 1 is typically ordered in the same order as would be expected for the original COBOL program, and has the same "amount" (number of bytes) provided for each variable as expected for the original COBOL program. This would be optional for those data items in the original COBOL program which are not shared by redefine clauses, or in structures, or written to files. For variables that are indeed shared by redefine clauses, or in structures, or written to files, it is an advantage to store that data in the same format, and order as the original COBOL program. Relative to COBOL structures in FIG. 3, COBOL structure "SA" 330 is or represents an object that describes any necessary attributes of the structure, and further provides reference or points to the starting memory location of the structure 311.

One possible exemplary list of descriptive attributes for a COBOL "object" which is of a decimal numeric type is also shown in FIG. 3, as illustrated by an object having reference number 370. The attributes of the object 370 include a Reference Pointer 371 for locating the actual data in memory, and a collection of other attributes 372 describing the precise characteristics of the decimal numeric variable. It is again important to note that the descriptive attributes of the COBOL variable could be stored in any manner. However, storing them as an "object" or referenced from an object enables the generation of program flow code in the translated program using mathematical notation, relying at run-time on a run-time library containing definitions of overloaded operators to implement those mathematical operations between objects. The translation step 214 of FIG. 2 generates text in a manner that causes creation of the objects, and the translation step 215 of FIG. 2 generates text describing mathematical operations in mathematical equation form that relies on those operations being available at run time from a special run-time library.

Figure 4:
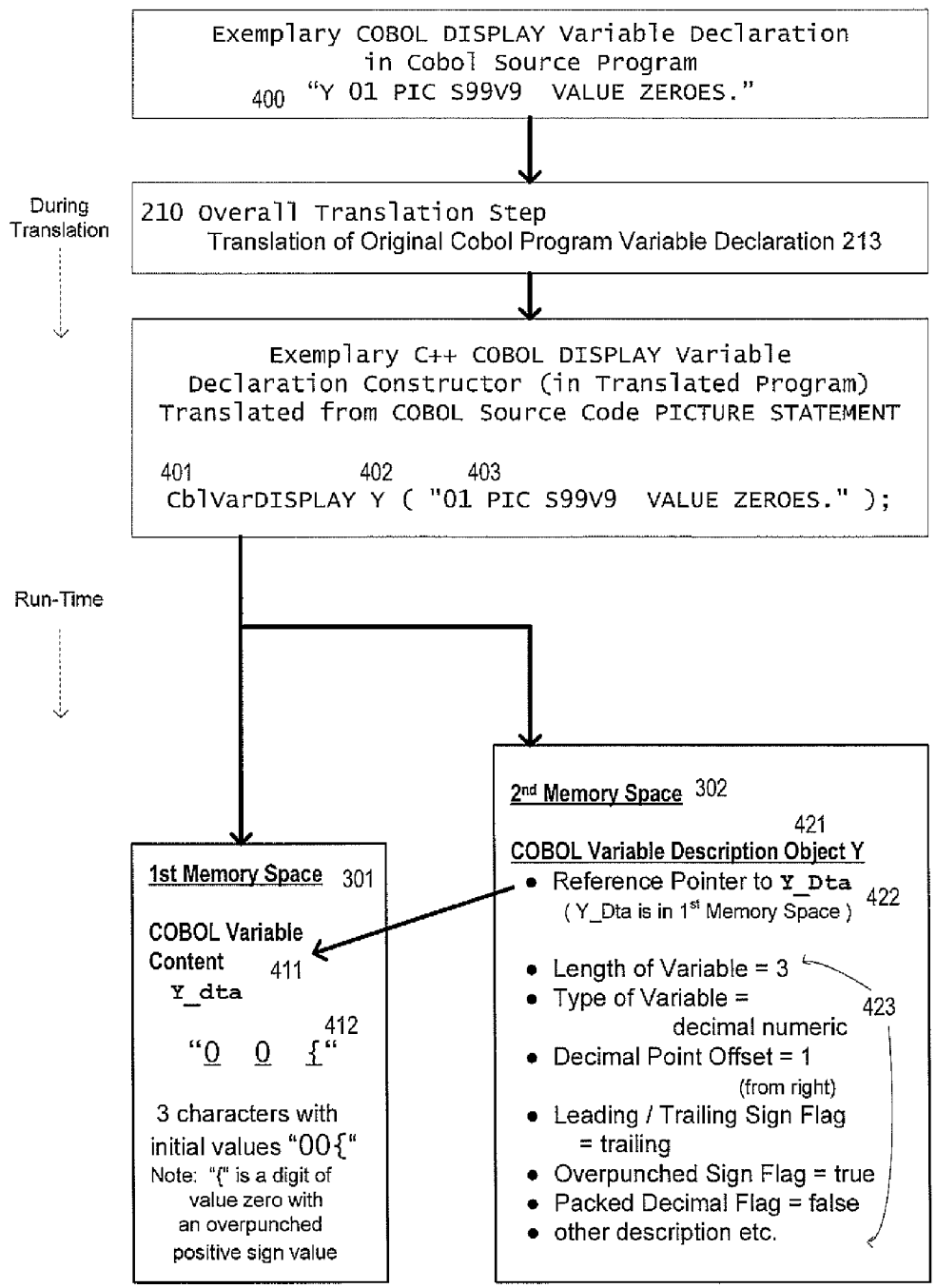
FIG. 4 illustrates according to the teachings of the present invention the translation, with the computer system of FIG. 1 controlled by a controlling program, of a COBOL source program PICTURE statement, obtained from storage accessible by the computer system, into descriptive statements within the translated computer program of FIG. 2 in an object oriented programming language, the descriptive statements comprising calls/invocation of Constructors, the calls to the Constructors including text in readable form as in the COBOL language, the Constructors in turn enabling allocation and initialization of the two separate areas of storage as in FIG. 1, the first storage for storing variable content, and the second storage for storing descriptive attributers of the variables, the second storage also including space for storage of a pointer for referencing the variable content of the related variable stored in the first memory space.

A more detailed description of storage in a translated program for a specific COBOL variable is depicted in FIG. 4. An exemplary C++"Constructor" named "CblVarDISPLAY" 400 is shown with an input argument text that is a PIC statement. The text of the PIC statement is identical, in this example, to the descriptive text for that variable in the original COBOL program which provides convenience and readability to both COBOL programmers, and to those maintaining the program in C++. At run time, as described in later detail herein, a special run-time library which contains the program code of the constructor receives the text of the PIC statement, parses it, processes it, and builds the object 421 in the second memory space 302, and further allocates in the first memory space 301 storage locations for the data of the COBOL variable described by the PIC statement within reference element 400.

FIG. 4 illustrates as part of an overall translation step 210 of FIG. 2 the translation step 213 of translating an original COBOL variable declaration into descriptive statements within a translated computer program in an object oriented programming language. The translation step 213 is performed by a computer system 110 as depicted in FIG. 1, the translation step being controlled by an exemplary translation control program 112. FIG. 4 illustrates an exemplary COBOL source program PICTURE (PIC) statement 400, obtained from storage accessible by computer system 110 translated by a translation step 213 into a descriptive statement 401 within a translated computer program in an object oriented programming language. The descriptive statement 401 in this example comprises calls/invocation of a Constructor 401 named "CblVarDISPLAY" that provides an indication to a programmer that a COBOL Variable object will be created by a call to the Constructor having that name.

With continued reference to FIG. 4, the translation of an original COBOL Program Variable Declaration step 213 (first shown in FIG. 2) creates the text "CblVarDISPLAY" 401. The translation step 213 also provides a name for the object created by the constructor, with the object preferably named the same (or closely related) to the name of the original COBOL variable described in the original COBOL source code PIC statement 400, which in this example is named "Y" as designated by reference number 402. The arguments to the constructor are enclosed in parentheses and include an argument that describes the variable to be created in text form in the syntax of the original COBOL statement 400. That is, the call to the Constructor 401 includes text in readable form as in the COBOL language 403, that is, the text describing the original COBOL program variable. In this example, a COBOL PIC translated statement from an original COBOL source program includes the text: "01 PIC S99V9 VALUE ZEROES." as an argument to the constructor 401 which describes the variable in COBOL syntax (syntax of COBOL). This text comprises two pieces, the declaration of the variable name "Y" which is provided as the name of the object, and the descriptive text describing the variable "01 PIC S99V9 VALUE ZEROES.". In this example, this exemplary PIC statement 400 is translated during the Translation of Original COBOL Program Variable Declarations step 213 into a Declarative Program Statement in the Second Programming Language 221 which for this example is a call to a C++ Constructor 400, the object created by Constructor 400 named "Y" 402, and an argument to the Constructor 401 being the text "01 PIC S99V9 VALUE ZEROES.". The text passed to the Constructor 400 could also optionally include the name of the variable "Y" as "01 Y PIC S99V9 VALUE ZEROES.". The "01" which is the COBOL "level" number might also be optional.

It is necessary in certain illustrated embodiments of the present invention that the name of the object be the same as the original COBOL variable (with allowances for language requirement differences). Naming the object created by the Constructor with the same name as the original COBOL variable enables referencing within the Program Operation Statements 225 in the Second Programming Language to reference those objects using the original COBOL variable names. Further, optionally, the use of operator overloading, allows expressing relationships upon and between those objects using mathematical notation in the second programming language (i.e. C++ in this example).

The Constructor itself is known or understood by the translator as providing for allocating and initializing two separate areas of memory, a first memory space 301 for storing variable content 412 for variable "Ydta" 411, and a second memory space for storing a COBOL variable descriptive object 421 which includes within it storage of descriptive attributes 423 of the variable 411, and also storage of a pointer element or entity 422 for referencing the variable content 412 of the related variable 411 in the first memory space 301. The known characteristics and functions of the Constructor, and a run-time library which contains the Constructor must in general be known by the translator, and assumptions on the functionality will of course have influence on the precise details of the translation. It is advantageous for ease of understanding, and also for portability if the arguments to the Constructor are passed as text strings, and it is a further advantage to provide for the arguments to be passed in the known and well defined syntax of COBOL. The variable "name" may or may not be included in the actual string defining the attributes of the translated variable. Providing the variable name in text form may provide advantage in forming displays for debug, or for other purposes in interacting with a programmer.

FIG. 4 illustrates an example of the detailed results from parsing the descriptive portion of the text of the PIC statement passed to the Constructor. As indicated, a COBOL Variable Description Object 421 named "Y" is created and stored into second memory space 302 by the Constructor. The attributes of the variable 423 are determined by parsing the descriptive portion of the text of the PIC statement, this parsing being performed at run-time, or optionally with a compiler preprocessor. Also created during and by processing of the Constructor is a reference pointer 422 (or reference value) which provides reference to the actual data content of the variable 411, the actual data content being stored in a separate first memory space 301. Any necessary initialization of the actual data in the first memory space 301 is illustrated by a variable name "Y_dta" 412 initialized with the character string "00{", this string representing a value of zero with an overpunched sign value. The descriptive attributes 423 of the variable 412 which are utilized in performing operations upon or utilizing this object are stored in the second memory space 302 as shown.

It is to be noted that this example illustrates the storage of a variable type from the original COBOL program which is not directly supported in a language other than COBOL, such as the exemplary C++ programming language. The use of a constructor to create and manage such a variable, and the description of the variable in text having the syntax of COBOL, enables the translation step for both the declared variables, and the program operations statements to be readable and maintainable. Further, the separation of storage for the content of the variable and the attributes of the variable enables the storing of the actual content of the variables created in this manner to be in the memory format of the original COBOL program. This in turn enables this data to be shared or managed by other programs, which not only allows sharing, but also may provide increased ease in the migration of a suite of COBOL programs into programs in the second language. That is, since the data in memory and on files is optionally in the same format as the original COBOL language, programs can be translated, utilized and tested one program at a time (or in groups smaller than the whole).

FIG. 5 provides illustration of a further translating step 525 that could be an optional further part of the overall translating step 210 of FIG. 2. FIG. 5 illustrates translating a COBOL source program File Description statement describing attributes of a file accessed by the original COBOL program, into a call to a (exemplary C++) Constructor 550. The call to the Constructor is used at run-time to create an object for describing attributes of the file based upon a descriptive text string provided as one or more arguments to the Constructor. The call to the Constructor and the text-based arguments to the Constructor are "translated" during a file description translation step 525 from the text of the original COBOL program description of the file 500 into a closely related textual description of one or more attributes of the file 550 having a COBOL-like syntax. The translation of the text from the original COBOL source program is used to provide in the translated program file, a description in COBOL-like syntax of the file's attributes. The file attributes can be described in a call to a file description constructor such as the call to "Cbl-FileSelect" shown in block 550. The name of the file might preferably be the name of the object created to hold the attributes, such as "F1" in the example translation step 525 files 500 to 550. There may be an advantage in choosing a format for the descriptive text that is more easily parsed than the original COBOL statements, but which expresses clearly, in a COBOL like syntax, the attributes of the file described in the original COBOL program. It may also be advantageous to retain a syntax identical to that of COBOL. In the example of FIG. 5 illustrating the translation step of translating a COBOL File Description Statement (or multiple statements relating to a single file), the file with reference number 500 is illustrated with the translated text expressed in a COBOL syntax for each phrase of the file description, and with phrases separated by commas so that each phrase is an individual argument to an exemplary "CblFileSelect" C++ Constructor. This retains the COBOL-like syntax and provides readability and maintainability in the translated program code. This syntax might even be more readable than the original COBOL because the translator has done the work of dividing the text description into more easily understood individual phrases.

It is to be noted with reference to FIGS. 4 and 5 that the exemplary translation steps relating to translating variable declarations and also file description statements can be practiced directly in both C++ and JAVA, without a preprocessing of the translated program, since both of these programming languages support the concept of object creation at run-time, and these objects can be created at run-time based upon parsing of one or more text arguments translated directly from the original COBOL source program.

It will be further noted that FIG. 5 illustrates descriptive text describing a COBOL file in a manner in which there are a plurality of text string arguments, each defining one or more attribute of the file, and the arguments themselves are arranged so that the parsing of the plurality of strings is simplified in comparison to parsing a single long string. Also, attributes which might benefit from having a text field (in quotation marks) defining a text or numeric value to follow may provide for improved readability or ease in parsing. The key is that the text strings be in the "syntax" of COBOL, so that a COBOL programmer does not have to learn new ways to describe a variable, or use subroutines with names which imply some attribute of the variable or a signal on how to interpret an argument to that subroutine.

Figure 6:
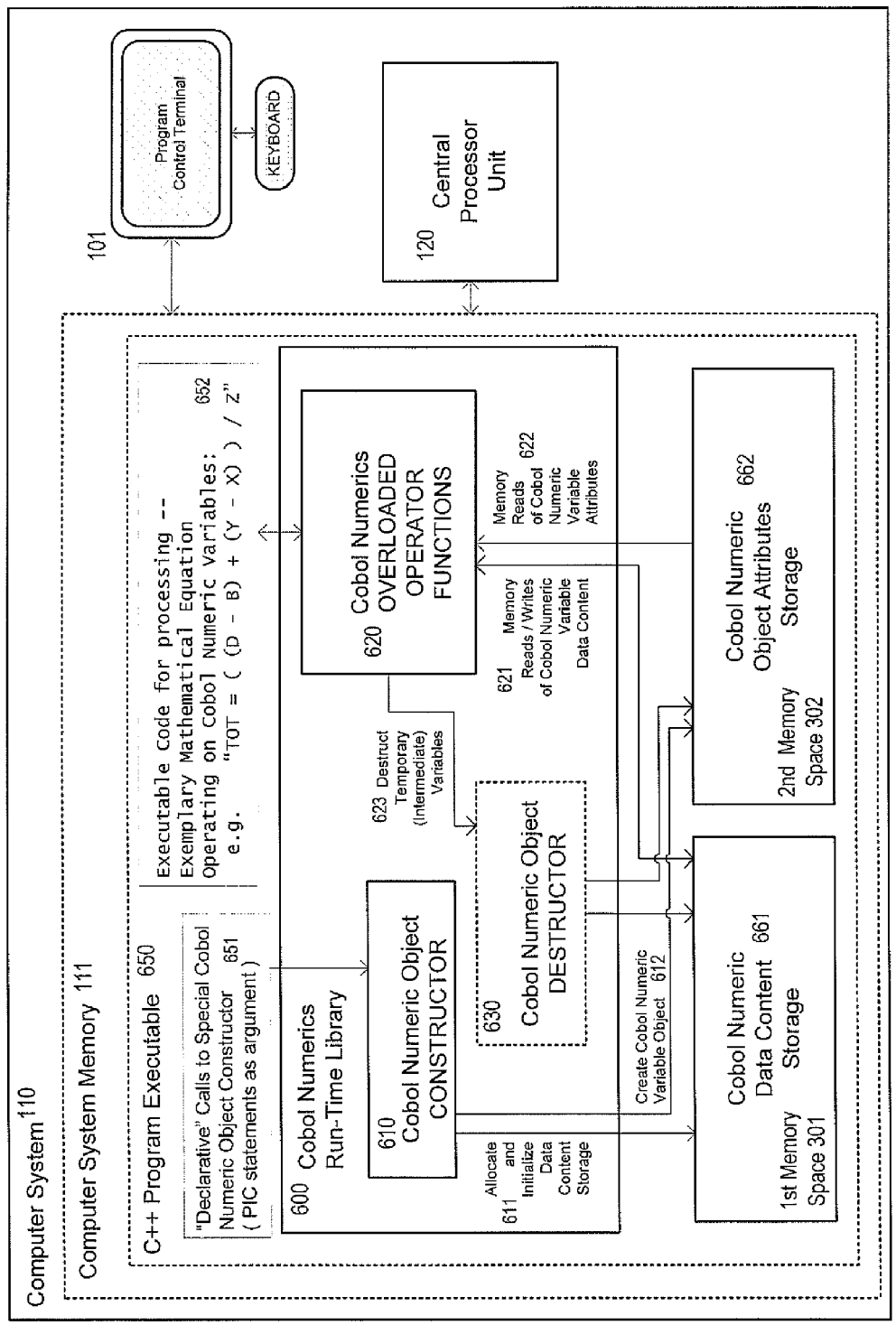
FIG. 6 illustrates according to the teachings of the present invention, a special COBOL Numeric Processing Run-Time Library which provides processing of COBOL Numeric Variables while running a C++ Executable Program on a computer system, the C++ Executable being built from a C++ program translated from an original COBOL source program, or optionally translated or written by hand, the special run-time library utilized as illustrated in the figure to process COBOL data variables and files from a program in a second programming language.

FIG. 6 provides illustration of a special run-time library 600 that provides processing between and upon certain data of an executable program 650, the certain data being that of COBOL variables of the COBOL numeric data type. In this illustration, the special run-time library 600 provides services/facilities to a C++ program executable 650, which is loaded into the computer system memory 111 of the computer system 110. The executable 650 contained in memory 111 is "run" or is started on command entered by a programmer from a program control terminal 101 and the executable 650 is processed under control of a central processor unit 120 of the computer system in a typical manner. The executable 650 is optionally started, stopped, and/or provided data from a program control terminal 101 or any computer workstation. During startup of the translated program or during certain initial calls to processing subroutines of the executable, "declarative" calls 651 are made by the executable 650 to special COBOL Numeric Object Constructor routines 610 which are a part of or stored in the run-time library 600. The Constructor(s) 610 creates an "object" 612 which corresponds to a COBOL Numeric Object 302 that contains attributes that describe the COBOL Numeric variable. The attributes are provided to the Constructor 610, in an appropriate manner, as a text argument equivalent to the "PIC" (PICTURE) statement in the original COBOL source program. The special run-time library provides for the text of the PIC statement (in the translated program) to be parsed at run-time by the constructor 610 that determines the attributes and storage requirements, which results in creating an object 612 in the "second" storage area 302. The constructor also, in this preferred illustrated embodiment, allocates and initializes storage 611 in a first memory space holding the actual data content of the variable. A data field in the COBOL Numeric Object (a COBOL variable reference object) includes a reference pointer to the "first" storage area in which space was allocated for storage of the actual data content of the COBOL variable.

That is, The COBOL Numeric Object Constructor 610 receives a PIC statement 651 from the C++ Program Executable 650. The PIC statement is analyzed by code of the constructor 610 and an object is created 612 to hold attributes of the numeric variable. The Constructor 650 also allocates actual storage space for the data content 611 in first memory space 301.

The data content storage area is managed separately from the storage for storing attributes in order so that the data content for a plurality of COBOL variables can be organized in the same way as in the original COBOL program. This is accomplished, in this illustrated embodiment, by ordering the calls to the Constructor in the same order as variables are described in the original COBOL program, such that the Constructor has the capability or enough "knowledge" to enable storage to be allocated and organized in an identical manner to the original COBOL program. This provides significant advantage in that organizing the data in this way allows the data to be shared with untranslated COBOL programs, and maintains file formats etc.

Again referring to FIG. 6, once the COBOL variable objects are created, the executable program 650 then processes that data by making reference to those objects. In FIG. 6, an example equation 652 is illustrated which is "TOT=((D−B)+(Y−X)/Z". Processing of the C++ executable code related to this mathematical expression is performed by making calls to Overloaded operator functions 620 which process the object variables (TOT, D, B, Y, X, and Z). The overloaded operator functions 620 utilizes the COBOL Numeric Attributes in the object for each variable, and then performs the necessary processing on the data content referenced from those same objects. In FIG. 6 it is noted that the Overloaded Operator Functions 620 reads attributes from the COBOL Numeric Object Attributes storage 662 in second memory space 302, and reads and writes 621 the COBOL Numeric Data Content Storage area 661 in memory space 301

It can be seen by further examination of FIG. 6 that the COBOL Numeric Data Content Storage 661 and the COBOL Numeric Object Attributes Storage 662 is "written" (or initialized) by the Constructor. The Overloaded operator function code "reads" the attributes, and then reads and writes the data content to perform the required operation.

A "COBOL Numeric Object Destructor 630 is also illustrated in FIG. 6 as being optionally called 623 by the overloaded operator functions 620 in order to release memory that might be necessarily created for storage of temporary numeric objects/data while complex equations are being processed.

FIG. 7 is a source program listing including reference lines 7001 through 7026, of an exemplary COBOL program named EXAMP1.cbl, the program serving as a first example program in illustration of COBOL program source for translation into a second programming language. Exemplary COBOL "PICTURE" (or "PIC") statements are illustrated on lines 7007 through 7015. This code illustrates in the COBOL language, a declaration of COBOL variables, named A, B, C, D, and W, X, Y, and Z. It is to be noted that these variable types are quite unique to COBOL, in that most other programming languages, such as C, C++ and JAVA do not provide as a part of the "standard" language, any mechanism for describing variables of these types. Specifically, the COBOL language provides for variables which are quite useful for business programming with precise and detailed representation of decimal numbers and operations between decimal numbers of different and varied formats. The COBOL language also provides options for limiting memory usage for storage of variables by providing for "packed" decimal numbers, and for decimal numbers with "overpunched" signs. Note in FIG. 7, lines 7018 through 7022 that describe COBOL program operation between variables of different decimal types. These examples are somewhat trivial but are indicative of the mixture of variable types allowed by the COBOL language. It is also to be noted that the "program variable declarations" are contained in the COBOL program "WORKING-STORAGE SECTION" that begins following line 7006, and that the "program operation" statements are contained in the "PROCEDURE DIVISION" which begins following line 7016.

FIG. 8 provides a "C" program listing on seven sheets including, reference lines 8001 through 8227, illustrating exemplary "C" code produced using a prior art tool from COBOL-IT company, the input to the translation process being the EXAMP1.cbl COBOL program of FIG. 7. It is to be noted that the program listing in the "C" language for this exemplary translation by the COBOL-IT program is seven pages long, whereas the original COBOL program was less than one page. This fact in itself is a detriment to readability, and even the "main" part of the program in "C" beginning at line 8174 occupies approximately 50 lines (8174-8224) whereas the original procedural code in the original COBOL program was approximately 7 lines (lines 7018-7025 in the listing of FIG. 7). It is interesting to note that the translation of the program code for line 7022 of the source program which is:

7022 COMPUTE $TOT=((D-B)+(Y-X))/Z$.

and translated by the prior art COBOL-IT tool into the following:

37 EXAMP1.cbl" program as discussed above, the translated program being translated by the method of an illustrated embodiment of the present invention. In particular, it is to be noted that line 22 of the EXAMP1.cbl program which again is:

7022 COMPUTE $TOT=((D-B)+(Y-X))/Z$ is translated into the "C++" code of:

9022 $TOT=((D-B)+(Y-X))/Z$;

which is quite readable, and would be easy to modify for purposes of enhancing the code or in maintenance of the translated program code.

Other similar examples can be easily seen by examining other instances of translation provided in the these figures.

FIG. 10 is a translated program listing including reference lines 10001 through 10027, of the same COBOL "Examp1.cbl" program translated with a more preferred translation step that allocates memory space for both storage of the actual data of the described variable, and storage space for the object which describes attributes of the described variable. This approach requires that the Constructor manage and allocate overall memory space in two separate memory spaces, one for storage of the actual data, and a second memory space for the storage of the attributes of the variable. This allows the storage space for the actual data of the variable to be somewhat more hidden from the programmer.

FIG. 11 is a partial listing of exemplary program code including reference lines 11001 through 11140 encompassing four sheets, that is illustrative of C++ code providing a CLASS description, a CONSTRUCTOR, a DESTRUCTOR, and an Overloaded Operator in a simplified example of code utilized according to an illustrated embodiment of the present invention.

FIG. 12 is a source code listing, including reference lines 12001 through 12034, of a second exemplary COBOL program, the program named EXAMP2.cbl. This program resembles the COBOL program EXAMP1, but is slightly more complex to illustrate the results from running the program.

FIG. 13 is a listing of output, wherein reference lines 13001 through 13004, are produced from running the exemplary COBOL program source file EXAMP2 of FIG. 12.

```
8196  cob_decimal_get_field (rtd, &(COB_MDS f_EXAMPLE.d0), &f_13, 0);
8197  cob_decimal_set_int (&(COB_MDS f_EXAMPLE.d0), cob_get_numdisp (b_9, 2));
8198  cob_decimal_set_int (&(COB_MDS f_EXAMPLE.d3), cob_get_numdisp (b_7, 1));
8199  cob_decimal_sub (rtd, &(COB_MDS f_EXAMPLE.d0), &(COB_MDS f_EXAMPLE.d3));
8200  cob_decimal_set_int (&(COB_MDS f_EXAMPLE.d2), cob_get_numdisp (b_12, 2));
8201  cob_decimal_set_int (&(COB_MDS f_EXAMPLE.d3), cob_get_numdisp (b_11, 1));
8202  cob_decimal_sub (rtd, &(COB_MDS f_EXAMPLE.d2), &(COB_MDS f_EXAMPLE.d3));
8203  cob_decimal_add (rtd, &(COB_MDS f_EXAMPLE.d0), &(COB_MDS f_EXAMPLE.d2));
8204  cob_decimal_set_int (&(COB_MDS f_EXAMPLE.d1), cob_get_numdisp (b_13, 1));
8205  cob_decimal_div (rtd, &(COB_MDS f_EXAMPLE.d0), &(COB_MDS f_EXAMPLE.d1));
8206  cob_decimal_get_field (rtd, &(COB_MDS f_EXAMPLE.d0), &f_14, 0);
```

It is to be noted by examining the above lines of code that the prior art translation translates one line of COBOL into eleven lines of calls to library subroutines, and further that it would be difficult to decipher without significant work what the lines of translated code are doing. Each of the lines comprises a call to a subroutine with arguments that are not obviously related to the original line of COBOL program, and with meaning or significance of the variables not easily predicted from the original COBOL program. This renders the translated code as not easily readable, nor maintainable.

FIG. 9 is a translated program listing including reference lines 9001 through 9029, translated from the same COBOL FIG. 14 is a "JAVA" program listing including reference lines 14001 through 14059 on two sheets, for illustrating exemplary JAVA code produced using a prior art tool described as the NACA tool in which the input to the translation process is the EXAMP2.cbl COBOL program of FIG. 12.

FIG. 15 is a listing of second exemplary "readable" C++ program code, including reference lines 15001 through 15027, illustrating a possible translation of the COBOL EXAMP2.cbl program into "C++" program source code using one or more steps of an illustrated embodiment of the present invention, this translation illustrating a translation that may be preferred with regards to memory allocation in comparison to that of the translation listing illustrated in FIG. 9.

FIG. 16 is a "JAVA" (prior art) program listing including reference lines 16001 through 16224 on seven sheets, illustrating a second exemplary JAVA code produced using a prior art tool available on the World Wide Web (Internet) from http://OpenCOBOL2JAVA.sourceforge.net/, the input to the translation process being similar to the EXAMP2.cbl COBOL program provided in FIG. 12. Lines 16163 through 16193 reproduced separately on Sheet 1 of FIG. 16 illustrate the main portion of the translated JAVA program code. In this example, the lines of code 16181 and 16182 provide an illustration of a mathematical expression in the original COBOL program of "COMPUTE TOT=((D−B)+(Y−X))/Z" translated to a line of JAVA code: "setTot((int)((double)(((getD( )−getB( ))+(getY( )−getX( )))/getZ( )));". This describes the mathematical equation in somewhat mathematical form, but with intermediate calls to subroutines to "get" the values of COBOL variables, and with conversion of those variables to the JAVA "double" (floating point), or "int" (integer) data types. This approach does not provide for precise decimal accuracy, especially for large numbers of digits, and does not provide for expressions using variable names that are identical to that of the original COBOL variables. It is also not apparent that this approach is able to provide for storage of data in the same or equivalent data structures and memory format to that of the original COBOL program.

Immediately following the above is a more detailed description of the difficulties in performing a translation of COBOL source code into a readable program in a second programming language than previously contained in the main specification. The purpose of this detailed description is to more completely describe the combination of considerations required in order to accomplish a readable translation. This detailed description is followed by a glossary section that provides a more detailed description of certain terms and programming approaches used and referenced within the specification.

Detailed Description of Difficulties in Achieving Readable/Maintainable Code in a Translation from Cobol to a Second Programming Language Such as C++

The tools of the prior art, such as COBOL-IT and Open-COBOL.org, which provide for translation of an original COBOL source program to a second program in the "C" programming language do not generate adequately "readable" or "maintainable" program code in that second programming language. This is true even though improved readability is an obviously desirable feature.

Certain of these translation approaches of the prior art express the program in a form that is closer in readability to machine or assembly language than to that which would normally be considered a high-level programming language. As a result, a programmer or person reading the translated program code is not readily able to understand the functionality or program flow of the translated code, nor is it at all easy to maintain, modify, or change the translated code to add functionality or to fix "bugs". Further, the declaration of variables in the translated program is typically only an allocation of memory space with variables not declared in a manner that describes or characterizes the format or use of the variable.

As discussed above, the prior art NACA JAVA tools, produce code that is more "human readable" (in the "JAVA" language) in comparison to that of COBOL-IT and OpenCOBOL.org, but the code produced by the tool translation is still not in a form that is as "readable" (to a human programmer) as that of the original COBOL source code, nor does it provide for a user (programmer) to easily "write" or modify the code in order to make changes, make improvements, or to fix "bugs" in the translated program code. As with the COBOL-IT and OpenCOBOL.org tools, the JAVA tool translates ("transcodes" is the word of the authors of the NACA tools) mathematical expressions in the original COBOL source code (typically COBOL "COMPUTE" statements or equations) into a series of possibly nested subroutine or function calls which perform the needed functions based upon calls to specifically named library routines. The calls to potentially many subroutines and the nesting of subroutine calls typically makes the resulting code not easily readable.

There are several reasons as to why these improvements and/or advantages, and others as in the manner illustrated in various exemplary embodiments of the machine implemented method of the present invention, were not achieved in the prior art, even though the goals are desirable. First of all, the JAVA and C or C++ programming languages do not directly provide data types identical to many of the data types allowed in the COBOL language. This means that variables cannot be declared and typed directly, and operations between the COBOL variables, especially mathematical operations, cannot be directly described in equation form. Second, the programming code generated by the prior art tools does not utilize certain object based programming concepts because that approach has been incompatible with the memory mapping requirements of the COBOL language. Third, according to the teachings of the present invention, the memory model for mapping COBOL data variables into memory space in the second programming language requires that the data be allocated in memory space which is similar or identical to that to the original COBOL memory mapping, in order to maintain compatibility with other programs, subprograms or library routines, and more importantly, to provide for implementation of COBOL constructs such as "structures", "arrays" and "redefines" which require that the memory mapping in the second language be identical or at least very similar to that of the original COBOL compiler. This is not achievable when variable data is made a part of normal C++ or JAVA objects. Fourth, the wide variety and large number of possible user defined data types in COBOL are not easily mapped or translated into data types that can be supported using object oriented programming techniques such as overloading of operators because the data itself is typically declared in a manner that simply allocated space in memory, and not in a manner that described the type of data in a separate memory space. Fifth, the prior art allocation of memory for storage of "COBOL" data is done at compile time, rather than at run-time.

In embodiments of the machine implemented method of the present invention, these problems are solved utilizing a novel object oriented approach that provides for the advantage of producing readable and maintainable code while maintaining compatibility with the memory mapping/memory layout scheme of data, including structures, arrays, and redefined data in the original COBOL program.

These techniques or methods are not used or suggested in the prior art tools of NACA JAVA, COBOL-IT, or OpenCOBOL.org. The prior art approach and description of the NACA JAVA tool specifically prohibits or teaches against the use of an object oriented approach in expressing the COBOL code in JAVA. Example of this teaching against the use of an object oriented approach can be found in several places within documentation describing the NACA JAVA project. For example, the NACA JAVA documentation states:

1) "Transcoded program must achieve a 1 to 1 line matching with the COBOL program. This implies that they are not object oriented, and that the original line ordering is kept." (emphasis added) from "Naca Whitepaper—Transcoding and runtime concepts" from documentation of NACA code captured by Google code database at: http://code.google.com/p/naca/wiki/Naca0201-Naca—Whitepaper-Introduction/Transcoding and runtime concepts.
2) "Generated JAVA remains procedural, not object oriented, on purpose to keep COBOL application programmers on board" (emphasis added)—from "NacaTrans: Main Goals slide in "Project NACA: automated migration from Mainframe & COBOL to Linux & JAVA" by Didier Durand and Pierre-Jean Ditscheid Publicitas & Pixedia Submission #9161 JAZOON09, documentation describing the International Conference on JAVA Technology, Jun. 22-23, 2009, Zurich.

As stated by the authors of the NACA tool, the JAVA code produced by the NACA tool is intentionally not "object" based. This does not mean that objects are not used in any way in the program, which would be contrary to most programming done in JAVA. But, the Naca JAVA tool does not implement the storage of the actual data and the description of the data of the variables in a manner that would provide for mathematical equations and other alternative expressions for describing arithmetic operations between variables in the original COBOL source program to be transcoded into mathematical expressions between variables in the translated JAVA program. In fact, because of lack of support in the Java language for operator overloading on user objects, Java in its standard form would not provide for mathematical expressions between object using arithmetic operators. Furthermore, in the translated Java examples, it is not apparent that the data of the COBOL variables themselves is necessarily allocated in a manner that is directly related to the storage of data defined in the original COBOL program, which is necessary in establishing compatibility in data access with existing COBOL programs and/or subprograms.

For these reasons, the methods of supporting the COBOL data types chosen for implementation in the COBOL-IT/OpenCOBOL.org tools for "C" language and in the NACA tools for JAVA language, do not allow for direct expression of mathematical expressions in the second programming language. In addition, the format for declaration of variables in the translated program for both prior approaches exemplified by COBOL-IT and the NACA tool are dissimilar to the format and requirements of the COBOL language, and not described in text that is immediately readable by a COBOL programmer.

The prior art tools for translating or "transcoding" COBOL to C/C++ or JAVA also do not provide for declaration and/or description of variables in the translated program file utilizing descriptive text that is identical or easily determined based upon the descriptive text in the original COBOL source file, or as might be considered as being related to the language of COBOL itself. None of the tools or methods of the prior art suggest or provide or enable translation of general original COBOL COMPUTE statements (which are in a mathematical expression format) to be expressed in the output program as a similar or related mathematical "equation". Since C++ and JAVA do not support all COBOL data types, the prior art tools translate mathematical operations between variable types not directly supported as native types in the second language using calls to many subroutines or functions, sometimes with the calls nested in a complex manner. Thus the generated or translated code in the second language cannot be easily understood or "readable" by a human or programmer. Further, because of the complexity of this translated code, modifying the translated code in order to accomplish a change in functionality, would typically require changing the code significantly, from what was originally generated.

The COBOL language also provides several mechanisms for controlling program flow (program operation) which are somewhat different from those in other more modern languages and which are not necessarily easily expressed in other programming languages. For example, COBOL has program flow control statements called "PERFORMs" and has program statement groupings known as "paragraphs" which are unlike similar flow control mechanisms such as functions or subroutines defined in other languages. Equivalent control can of course be implemented in standard "C" or "C++", and JAVA, but the code that is necessary is not at a high-level and actually approaches assembly level programming. It is also not a "natural" way of controlling program flow or of programming in general in these second languages.

Other similar reasons and difficulties that have been encountered in approaches of the prior art would be understood by a person skilled and knowledgeable in the art.

Glossary Section including Discussion of Programming Related Terms

As material useful in understanding certain illustrated embodiments of the present invention, it is useful to describe several programming concepts, these approaches being of the prior art. Much of the text in the following description is taken from the Wikipedia website at http://www.Wikipedia.com, with searches of that site for the terms "operator overloading", "polymorphism", and "information hiding". There are of course many aspects of programming relating to these words and phrases not discussed here, but which will be understood by one skilled in the art of computer programming, especially object oriented programming.

In computer programming, the term "operator overloading" (less commonly known as operator ad-hoc polymorphism) is a specific case of "polymorphism" in which some or all of operators like +, =, or == have different implementations depending on the types of their arguments. Sometimes "overloading" is defined by the programming language; sometimes the programmer can implement support for new types. Operator overloading is useful because it allows the developer to program using notation closer to the target domain and allows user types to look like types built into the language. Operator overloading can easily be emulated using function calls; for an example, consider the integers a, b, c, and the equation a+b*c. In a language that supports operator overloading, and assuming that the '*' operator has higher precedence than '+', this is effectively a more concise way of writing: "add(a, multiply (b,c))".

The term "Polymorphism" is a more general programming language feature that allows values of different data types to be handled using a uniform interface. The concept of parametric polymorphism applies to both data types and functions. A function that can evaluate to or be applied to values of different types is known as a polymorphic function. A data type that can appear to be of a generalized type (e.g. a list with elements of arbitrary type) is designated as a polymorphic data type like the generalized type from which such specializations are made. There are two fundamentally different kinds of polymorphism. If the function denotes different and potentially heterogeneous implementations depending on a limited range of individually specified types and combinations, it is called ad-hoc polymorphism. Ad-hoc polymorphism is supported in many languages using function and method overloading. If all code is written without mention of any specific type and thus can be used transparently with any number of new types, it is called parametric polymorphism. Parametric polymorphism is widely supported in statically typed functional programming languages. In the object-oriented programming community, programming using parametric polymorphism is often called generic programming.

In object-oriented programming, the term "inclusion polymorphism" refers to a concept in type theory wherein a name may denote instances of many different classes as long as they are related by some common super class. Inclusion polymorphism is generally supported through subtyping, i.e. objects of different types are entirely substitutable for objects of another type (their base type(s)) and thus can be handled via a common interface. Alternately, inclusion polymorphism may be achieved through type coercion, also known as type casting.

The term "Information hiding" refers to a computer programming concept for the practice of hiding data in a message or file and is also called "Steganography". In computer science, information hiding is the principle of segregation of design decisions in a computer program that are most likely to change, thus protecting other parts of the program from extensive modification if the design decision is changed. The protection involves providing a stable interface which protects the remainder of the program from the implementation (the details that are most likely to change).

The term "encapsulation" is often used interchangeably with information hiding. Not all people agree on the distinctions between the two though; one may think of information hiding as being the principle and encapsulation being the technique. A software module hides information by encapsulating the information into a module or other construct which presents an interface. A common use of information hiding is to hide the physical storage layout for data so that if it is changed, the change is restricted to a small subset of the total program.

In object-oriented programming, "information hiding" (by way of nesting of types) reduces software development risk by shifting the code's dependency on an uncertain implementation (design decision) onto a hopefully well-defined interface. Clients of the interface perform operations purely through it so if the implementation changes, the clients do not have to change. The purpose is to achieve potential for change: the internal mechanisms of the component can be improved without impact on other components, or the component can be replaced with a different one that supports the same public interface. Encapsulation also protects the integrity of the component, by preventing users from setting the internal data of the component into an invalid or inconsistent state. Another benefit of encapsulation is that it reduces system complexity and thus increases robustness, by limiting the interdependencies between software components.

Encapsulating software behind an interface allows the construction of objects that mimic the behavior and interactions of objects in the real world. For example, a simple digital alarm clock is a real-world object that a layperson can use and understand. They can understand what the alarm clock does, and how to use it through the provided interface (buttons and screen), without having to understand every part inside of the clock. Similarly, if you replaced the clock with a different model, the layperson could continue to use it in the same way, provided that the interface works the same.

In the setting of an object-oriented programming language, the notion of information hiding is used to mean either an information hiding mechanism, a bundling mechanism, or a combination of the two.

The term "contiguous" with regards to arrangement of data or object items in computer memory address space, is used to describe a plurality of memory spaces which are adjacent or "touching" within a larger area of memory. That is, contiguous memory spaces for containing values of memory data are "adjacent" to each other in virtual (and/or real memory).

The term "adjacent" is meant to be interpreted generally. That is, "adjacent" does not necessarily mean that the address space of each data item is actually "touching" the next data item. For example, memory alignment constraints may require for example that certain data items begin (or end) on a word boundary, or block boundary. Thus two, or three, or some number of characters or words may be placed between "adjacent" data items for alignment with word, block, or page size boundaries, and still be considered adjacent, even though in actual memory space there is some "empty" space between them. That is, the term "contiguous" may encompass a plurality of memory spaces that are not precisely immediately "adjacent" but which may be separated by bytes or words to achieve byte, word, or block alignment based upon memory addresses.

The words contiguous and adjacency in description of memory space are meant to describe a plurality of variables in memory with memory space allocated as typically done in the prior art for a plurality of memory variables within in a structure, array, or table.

The terms "COBOL Structure" and/or memory "structure" are meant to be interpreted as a set of data items arranged in some meaningful order. One common COBOL feature that is used to describe a "structure" is the COBOL "TABLE" statement. COBOL table statements can describe one-dimensional "array" which are named sets of data items arranged in a meaningful order, with the array within the table composed of elementary data items having identical data descriptions. An "array" is a subset of a "table" in COBOL. Successive item positions in a table have ordinal position numbers such as 1, 2, 3, 4, . . . ; therefore any particular item can be identified by its ordinal position number, or a multiplier of that number dependent on the size (in memory) of elements of the structure.

In COBOL, arrays of two or more dimensions are described as "tables" which for two dimensions are specified with two items of information; a group entry and a subordinate entry. The total number of occurrences of the table items is the product of the numbers specified in the two entries. A table may be described as a "record" by a set of contiguous data description entries. In defining the record and its elements, any data description clause (USAGE, PICTURE, etc.) may be used to complete the definition (where required).

A hierarchical description of a table in COBOL may include the descriptive word "REDEFINES" which allows for a second description of a table to overlay a first description of a table, that is, a plurality of table definitions can describe a single area of memory. In other words, a REDEFINES clause allows you to have multiple field definitions for the same piece of storage. The same data then can be referenced in multiple ways. For example (COBOL code):

```
>>> 01 WS-NUMBER-X PIC X(8).
<<<<<<<<<<<<<<<<<<<<<<<<<<<<<<<<<
>>> 01 WS-NUMBER REDEFINES WS-NUMBER-X PIC 9(6)V99.
<<<<<<<
```

This portion of COBOL code in a COBOL data division only consumes 8 bytes of storage, not 16. Each of the two COBOL PIC clauses (PICTURE clauses) above is describing the same 8 bytes of data, just describing it differently, that is, with different interpretation of the contents of the associated data in memory.

For purposes of discussion within this document the use of the term "pointer" is meant to be interpreted as a general term meaning a memory pointer as in a "C" pointer, a "C++" pointer, an index into an array, a base memory address with an index, or any means of locating another item of data in memory described in a computer program, described in an executable program file, or in the memory space of an executing program running on the computer system on which it was compiled or on another (second) computer system.

For purposes of discussion within this document the use of the term "variable content" is meant to describe the "data" of a variable, that is, the actual "useful" data. For example, for a value of a decimal number "12345" in COBOL described with a PICTURE statement as having a format of PIC X(5), the term "variable content" refers to the actual value "12345" and not to the description of the format of that number.

For purposes of discussion within this document "Equation form" or "mathematical equation" form is meant to be interpreted as being an equation such as "A=B+C" or "DDD= (XXX/YYY)*ZZZ". This is in contrast to expression of functionality by calling subroutines or functions, possibly recursively, to perform equivalent evaluation, such as
"CALL ADD FUNCTION(A, B, C)". or,
"MULTIPLY_FUNCTION (DDD, ZZZ, DIVIDE_FUNCTION(XXX,YYY))".
Use of these terms is not meant to imply that calls to functions are prohibited, but rather that equation form is utilized for standard operations such as add, subtract, multiply, divide, assignment and other typical operations described utilizing arithmetic operators and provided as a basic part of typical computer languages such as C, or C++.

It is noted that the C++ language provides more than 30 operators, covering basic arithmetic, bit manipulation, indirection, comparisons, logical operations, and others. Almost all operators in C++ can be overloaded for user-defined types, with a few notable exceptions such as member access (. and .*). Overloading an operator does not change the precedence of calculations involving the operator, nor does it change the number of operands that the operator uses. Within this application the term "mathematical" operations is meant to include arithmetic operations such as addition, subtraction, multiplication, division, and comparative operations, and in general those operations which can be expressed in equation form using the normal arithmetic operators of the C++ language. For other languages, a similar interpretation would be taken.

It is noted that for purposes of this general discussion, that the terms "translated code" or "translated program code" is meant to describe the actual declarative, and/or executable processing statements including program flow and control code within the translated program in the second programming language. "Translated code" does NOT refer to "comments" or "comment statements" or sections of "comments" which are found embedded or included within the translated program. That is, the present invention improves over the prior art by improving the readability and/or maintainability of the "code" itself, in comparison to an approach of just optionally including in the translated code either selected or all original COBOL source code as "comments" embedded within the translated program as an aid to a programmer in trying to decipher the translated program "code".

From the world wide web URL address of: "http://www.tonymarston.net/cobol/cobolstandards.html#program_data" is found the following working description of COBOL data item definition.

"In COBOL all data items are defined in the following manner:
<level-number> <data-name> <picture clause>
where
<level-number> is a two-digit number which starts at 01 for record names and ascends up to 49 for all data items which are to be considered part of that record definition.
<data-name> is the name by which that particular data area can be referenced from within the program.
<picture clause> describes the format of that particular data-name (alphabetic, numeric, etc.)."

From the world wide web URL address of "http://www.3480-3590-data-conversion.com/article-cobol-comp.html" is found the following working description of how the PIC (PICTURE) statement and the USAGE clause affect storage size in a COBOL program:

"Which data type a field uses for storage is determined by the "usage is" clause in the field definition. For example,
05 BALANCE-DUE PIC S9(6)V99 USAGE IS COMPUTATIONAL-3.
says to store the field in the computational-3 format. The "usage is" part is optional and generally left off, and "computational" can be abbreviated "COMP", so you will more commonly see this written:
05 BALANCE-DUE PIC S9(6)V99 COMP-3.
The number of bits, bytes, or words that are stored for any given field usually depends on the number of digits given in the COBOL PIC. For binary numbers, 8 bits, or 1 byte, will store unsigned values from 0 to 255 or signed values from −128 to +127. This is enough to store values up to two digits (99), but not up to three digits (999). So a PIC 9 or PIC 99 would require 1 byte, but a PIC 999 would require 2 bytes.
In addition, most compilers have some minimum requirements for comp storage. For example, the smallest unit of storage may be 2 bytes, so even if you specify PIC 9 (only 1 digit), the compiler will reserve two bytes. Also see Synchronization and Alignment below.
Floating point numbers, however, follow standard binary formats and as such their sizes are not determined by a PIC, and no PIC is used in the field definition.
Comp-3 stores two digits per byte, in BCD form, as explained below."

From the same web site, the following further description of COBOL

Computational Fields is found:

"COBOL Computational Fields:
This is a discussion of COBOL computational fields. Several numeric data types are discussed, including the common "packed" and "comp-3" fields. By default, numeric values in COBOL files are stored in "display", or character, format, in the same way the letters of the alphabet are stored. That is, the value is stored as a base-ten number, with each digit represented by the corresponding EBCDIC (or ASCII) character. For example, the value 1234 is stored in four bytes which contain "1", "2", "3", and "4" (F1, F2, F3, F4 Hex for EBCDIC or 31, 32, 33, 34 hex for ASCII). But because computers perform computations with binary numbers, it is more efficient to store values in their native binary form than to store them in human readable base ten. If the number is stored in its native binary format it can be input from the file and used directly. If it's stored in a base ten format it needs to be converted to binary before performing calculations on it, then converted back to base ten for storage. Binary is faster -- typically about 8 times -- and usually requires less storage space."

From the world wide web URL address of:
"http://www.csis.ulle/cobol/course/datadeclaration.htm" is found the following description or example of a COBOL "Value Clause":

"A starting value may be assigned to a variable by means of an extension to the PICTURE clause called the VALUE clause.

Some examples:

| | |
|---|---|
| 01 GrossPay | PIC 9(5)V99 VALUE ZEROS. |
| 01 NetPay | PIC 9(5)V99 VALUE ZEROS. |
| 01 CustomerName | PIC X(20) VALUE SPACES. |
| 01 CustDiscount | PIC V99 VALUE .25." |

Thus, while the principles of the invention have now been made clear and described relative to a number of illustrative embodiments or implementations, it will be immediately obvious to those skilled in the art the many modifications or adaptations which can be made without departing from those principles. While the invention has been shown and described with reference to specific illustrated embodiments, it should be understood by those skilled in the art that various changes in form and detail may be made such implementations without departing from the spirit and scope of the invention as defined by the following claims.

Having described the illustrated embodiments of the present invention, it will now become apparent to one of skill in the arts that other embodiments or implementations incorporating the teachings of the present invention may be used. Accordingly, these embodiments should not be construed as being limited to the disclosed embodiments or implementations but rather should be limited only by the spirit and scope of the following claims.

What is claimed is:

1. A C++ object oriented run-time library for controlling operations of computer system, the run-time library for linking with a main C++ program and including methods, constructors, and overloaded operators for invocation at run-time under control of the main C++ program, the C++ object oriented run-time library stored in non-transitory storage accessible by the computer system and said non-transitory storage including:
   a) one or more COBOL variable object constructors invoked by the main C++ program at run-time, the object constructors constructing, at run time in the computer system main memory, a plurality of named COBOL variable C++ objects, each named COBOL variable C++ object being associated with one of a plurality of named COBOL type variables named by declaration in the main C++ program;
   b) an argument linking mechanism for receiving input arguments from the main C++ program and providing to the object constructors one or more text arguments readable as COBOL language PICTURE clauses, the text arguments describing attributes of the named COBOL type variable;
   c) COBOL variable constructor PICTURE parser program control code for parsing the one or more text arguments of the COBOL variable object constructors and determining data space requirements for storing in the main memory of the computer system actual data of the named COBOL type variables;
   d) COBOL variable data memory control code for managing a COBOL variable data storage area in the computer system memory, the managed COBOL variable data storage area for storing of associated actual data fields for the plurality of named COBOL type variables;
   e) storage space within the COBOL variable data memory control including storage of a reference pointer contained within or accessible by each named COBOL variable C++ object, the reference pointer enabling reference by the run-time library to the actual data fields contained in the managed COBOL variable data storage area for each of the one or more of the associated COBOL type variables;
   f) storage space within the COBOL variable data memory control including program code for arranging actual data fields for a plurality of the COBOL type variables in the main C++ program which are part of structure or group in the computer system memory in an order and in a manner as would be provided by a COBOL program describing a plurality of COBOL Picture clauses representing that same structure or group; and,
   g) COBOL variable object methods program control code for performing character operations between references to one or more of the named COBOL variable type objects constructed by the COBOL variable object constructors and for storing results into the actual data field referenced by the reference pointer of one or more of the named COBOL variable objects; and, COBOL variable object overloaded operators program code for performing mathematical operations between references to one or more of the named COBOL variable type objects constructed by the COBOL variable object constructors and for storing results into the actual data field referenced by the reference pointer of one or more of the named COBOL variable objects.

2. An object oriented run-time library file stored in a non-transitory storage unit for controlling operations on a computer system, the run-time library file being linked with a main program and loaded into a main memory of the computer system from the non-transitory storage unit, the object oriented run-time library file storing methods, constructors, and overloaded operations for innovation and access at run-time under control of the main program, the object oriented run-time library file stored in the non-transitory storage unit including:
   a) one or more COBOL variable object constructors invoked by the main program running on the computer system at run-time, the constructors constructing, at run time in a first storage area of the main memory, a plurality of named COBOL variable objects, each named COBOL variable object being associated with one of a plurality of named COBOL type variables named by declarations contained in the main program;
   b) an argument linking mechanism for receiving input arguments from the main program to provide one or more text arguments readable as COBOL language PICTURE clauses, the text arguments describing attributes of the named COBOL type variable,
   c) COBOL variable constructor PICTURE parser control code for parsing the one or more text arguments of the COBOL variable object constructors and determining data space requirements for storing actual data of the named COBOL type variables;
   d) COBOL variable data memory control code for managing a COBOL variable data storage area in the main memory, the managed COBOL variable data storage area for storing of associated actual data fields for the plurality of named COBOL type variables;
   e) storage space within the COBOL variable data memory control providing for storing a reference pointer within or accessible by each named COBOL variable object, the reference pointer providing for reference to the actual data fields in the managed COBOL variable data storage area for each of the one or more of the associated COBOL type variables;
   f) storage space within the COBOL variable data memory control enabling the actual data fields for a plurality of the COBOL type variables in the main program which are part of structure or group to be arranged in the computer system memory in an order and in a manner as would be expected by a COBOL program describing a plurality of COBOL Picture clauses representing that same structure or group;

g) first COBOL variable object methods code which performs character operations between references to one or more of the named COBOL variable type objects constructed by the COBOL variable object constructors and storage of results into the actual data field referenced by the reference pointer of one or more of the named COBOL variable objects; and, h) second COBOL variable object methods code which performs mathematical operations between references to one or more of the named COBOL variable type objects constructed by the COBOL variable object constructors and storage of results into the actual data field referenced by the reference pointer of one or more of the named COBOL variable objects.

3. A C++ object oriented run-time library file stored in a non-transitory storage unit accessible by a computer system, the C++ object run-time library file for controlling operations of the computer system, run-time library file linked and loaded with a main C++ program into main memory so as to control the computer system, the C++ object oriented run-time library file storing methods, constructors, and overloaded operations to be invoked at run-time under control of the main C++ program, the C++ object oriented run-time library file stored in the non-transitory storage unit including:

a) one or more COBOL variable object constructors invoked by the main C++ program running on the computer system at run-time, the object constructors constructing, at run time in a first storage area of the computer system memory, a plurality of named COBOL variable C++ objects, each named COBOL variable C++ object being associated with one of a plurality of named COBOL type variables named by declaration in the main C++ program;

b) each of the one or more COBOL variable object constructors including an argument linking mechanism receiving input arguments from the main C++ program and sending to the object constructor one or more text arguments readable as COBOL language PICTURE clauses, the text arguments describing attributes of the named COBOL type variable, c) COBOL variable constructor PICTURE parser program code running on the computer system parsing the one or more text arguments of the COBOL variable object constructors and determining data space requirements storing actual data of the named COBOL type variables;

d) COBOL variable data memory control program code running on the computer system and managing a COBOL variable data storage area in the computer system memory, the managed COBOL variable data storage area storing associated actual data fields for the plurality of named COBOL type variables;

e) the COBOL variable data memory control further including storage of a reference pointer contained within or accessible by each named COBOL variable C++ object, the reference pointer enabling reference by the run-time library file to the actual data fields contained in the managed COBOL variable data storage area for each of the one or more of the associated COBOL type variables;

f) the COBOL variable data memory control further including program code running on the computer system which enables actual data fields for a plurality of the COBOL type variables in the main C++program which are part of structure or group to be arranged in the computer system memory in an order and in a manner as would be provided by a COBOL program describing a plurality of COBOL Picture clauses representing that same structure or group;

g) COBOL variable object methods program code running on the computer system which performs character operations between references to one or more of the named COBOL variable type objects constructed by the COBOL variable object constructors and then storing results into the actual data field referenced by the reference pointer of one or more of the named COBOL variable objects; and, h) COBOL variable object overloaded operators program code running on the computer system which performs mathematical operations between references to one or more of the named COBOL variable type objects constructed by the COBOL variable object constructors and storing results into the actual data field referenced by the reference pointer of one or more of the named COBOL variable objects.

4. An object oriented run-time library stored in a non-transitory storage unit and installed on a computer system having a main memory and accessible by one or more users of the computer system, the object oriented run-time being accessed by the users for controlling operations of the computer system, the run-time library linked and loaded with the main program into the main memory so as to take at least partial control of the computer system, the object oriented run-time library storing methods, constructors, and overloaded operators invoked at run-time under control of the main program, the objected oriented run-time library stored in a non-transitory storage unit including:

a) one or more COBOL variable object constructors invoked by the main program running on the computer system at run-time, the object constructors constructing, at run time in a first storage area of the computer system memory, a plurality of named COBOL variable objects, each named COBOL variable object being associated with one of a plurality of named COBOL type variables named by declaration in the main program;

b) each of the one or more COBOL variable object constructors including an argument linking mechanism receiving input arguments from the main program and sending to the object constructor one or more text arguments readable as COBOL language PICTURE clauses, the text arguments describing attributes of the named COBOL type variable, c) a COBOL variable constructor PICTURE parser program code parsing the one or more text arguments of the COBOL variable object constructors and determining data space requirements storing actual data of the named COBOL type variables;

d) a COBOL variable data memory control program code managing a COBOL variable data storage area in the computer system main memory, the managed COBOL variable data storage area storing associated actual data fields for the plurality of named COBOL type variables;

e) the COBOL variable data memory control further including storage of a reference pointer contained within or accessible by each named COBOL variable object, the reference pointer enabling reference by the run-time library to the actual data fields contained in the managed COBOL variable data storage area for each of the one or more of the associated COBOL type variables;

f) the COBOL variable data memory control further including program code enabling actual data fields for a plurality of the COBOL type variables in the main program which are part of structure or group to be arranged in the computer system memory in an order and in a manner as would be provided by a COBOL program describing a plurality of COBOL Picture clauses representing that same structure or group;

g) first COBOL variable object method program code performing character operations between references to one or more of the named COBOL variable type objects constructed by the COBOL variable object constructors and then storing results into the actual data field referenced by the reference pointer of one or more of the named COBOL variable objects; and, h) second COBOL variable object method program code performing mathematical operations between references to one or more of the named COBOL variable type objects constructed by the COBOL variable object constructors and storing results into the actual data field referenced by the reference pointer of one or more of the named COBOL variable objects.

* * * * *